US011441587B2

(12) United States Patent
Binkert et al.

(10) Patent No.: US 11,441,587 B2
(45) Date of Patent: Sep. 13, 2022

(54) CLIP FOR SECURING AN ELEMENT TO ANOTHER ELEMENT AND USE OF A TWO-PART CLIP OF THIS TYPE

(71) Applicant: A. Raymond et Cie, Grenoble (FR)

(72) Inventors: Sven Binkert, Lörrach (DE); Kevin Maschat, Schwörstadt (DE)

(73) Assignee: A. RAYMOND ET CIE, Grenoble (FR)

( * ) Notice: Subject to any disclaimer, the term of this patent is extended or adjusted under 35 U.S.C. 154(b) by 735 days.

(21) Appl. No.: 16/093,584

(22) PCT Filed: Apr. 5, 2017

(86) PCT No.: PCT/EP2017/000421
§ 371 (c)(1),
(2) Date: Oct. 12, 2018

(87) PCT Pub. No.: WO2017/178098
PCT Pub. Date: Oct. 19, 2017

(65) Prior Publication Data
US 2020/0116177 A1    Apr. 16, 2020

(30) Foreign Application Priority Data

Apr. 13, 2016   (DE) .......................... 102016004336.9

(51) Int. Cl.
*F16B 2/24*   (2006.01)
*F16B 21/08*  (2006.01)
(Continued)

(52) U.S. Cl.
CPC ............ *F16B 2/243* (2013.01); *F16B 21/086* (2013.01); *B60R 13/0206* (2013.01); *F16B 2/245* (2013.01); *F16B 5/0635* (2013.01); *F16B 5/12* (2013.01)

(58) Field of Classification Search
CPC ........ F16B 2/243; F16B 2/245; F16B 21/086; F16B 5/0635; F16B 5/12; B60R 13/0206
See application file for complete search history.

(56) References Cited

U.S. PATENT DOCUMENTS 6,988,863 B2 *   1/2006   Hulin ...................... F16B 21/02
                                                    411/3
10,465,727 B2 *  11/2019  Schulz .................... F16B 21/02
(Continued)

FOREIGN PATENT DOCUMENTS

DE   112009001765 T5   8/2011
DE   102013014161 A1   2/2015
(Continued)

*Primary Examiner* — Robert Sandy
*Assistant Examiner* — Rowland Do
(74) *Attorney, Agent, or Firm* — Warner Norcross + Judd LLP

(57) ABSTRACT

A two-piece clip for securing an element to another element includes a first component having a head and a shaft extending from the head along a shaft axis having a point. At least one protrusion is provided on the shaft, having a contact surface facing the head, and the head having a contact surface facing the protrusion. The clip further includes a second component having a support surface facing the contact surface of the head, and a contact surface facing the protrusion. The contact surface of the head is supported on the support surface of the second component.

18 Claims, 20 Drawing Sheets

(51) Int. Cl.
*B60R 13/02* (2006.01)
*F16B 5/06* (2006.01)
*F16B 5/12* (2006.01)

(56) References Cited

U.S. PATENT DOCUMENTS

| | | | |
|---|---|---|---|
| 2003/0159256 A1* | 8/2003 | Clarke | F16B 21/084 24/297 |
| 2008/0219758 A1* | 9/2008 | Jatzke | F16B 21/18 403/282 |
| 2010/0272540 A1* | 10/2010 | Bucker | F16B 21/02 411/549 |
| 2011/0113598 A1* | 5/2011 | Hofmann | F16B 19/1081 24/458 |
| 2013/0302087 A1 | 11/2013 | Binkert | |
| 2015/0300388 A1 | 10/2015 | Maschat et al. | |
| 2016/0298668 A1* | 10/2016 | Kanie | F16B 5/0628 |
| 2017/0051780 A1* | 2/2017 | Dickinson | F16B 5/0657 |
| 2018/0163756 A1* | 6/2018 | Schulz | F16B 21/086 |

FOREIGN PATENT DOCUMENTS

| | | |
|---|---|---|
| DE | 102015209881 A1 | 12/2016 |
| EP | 3012465 A1 | 4/2016 |
| JP | 109237 A | 1/1998 |
| WO | 2010101803 A1 | 9/2010 |
| WO | 2012104250 A1 | 8/2012 |
| WO | 2012150004 A1 | 11/2012 |

* cited by examiner

CLIP FOR SECURING AN ELEMENT TO ANOTHER ELEMENT AND USE OF A TWO-PART CLIP OF THIS TYPE

TECHNICAL FIELD OF THE INVENTION

The invention relates to a clip for securing an element to another element, specifically a two-part clip, and a device with a first element and a second element secured to the first element by means of a clip, as well as to the use of a clip.

BACKGROUND OF THE INVENTION

Single-piece clips for securing a first element to another element are known from prior art. WO 2012/104250 A1, for instance, describes a single-piece clip with a head and a shaft extending from the head along a shaft axis, with a point. On the shaft of the clip known from WO 2012/104250 A1, a total of four protrusions are provided, each having a respective contact surface (clip surface) facing the head. The protrusions are spring-preloaded in a direction perpendicular to the shaft axis, and they reach across recesses provided on sides of the shaft. The clip known from WO 2012/104250 A1 features arms as part of the head, protruding from a base unit of the head. In the end portion of a respective arm, a respective contact surface of the head is provided, facing the protrusions. As follows from FIG. 5 of WO 2012/104250 A1, the single-piece clip described there secures an attachment 30 in the form of an airbag assembly as a second element to a mechanical high-capacity substrate 29 as a first element. The clip known from WO 2012/104250 A1 is a single-piece component generated by bending segments of a piece of metal. A disadvantage of the clip known from WO 2012/104250 A1 is that the metal element damages one of the elements that are to be secured to each other. Furthermore, the clip known from WO 2012/104250 A1 is not suitable for applications in which one or both elements that are to be secured to each other feature a hole reached through by the clip, but that is to be sealed against entrance of liquids, for instance when the clip is used to secure a panel to a vehicle frame.

BRIEF SUMMARY OF THE INVENTION

Against this background, the task of the invention was to provide a clip for securing a first element to a second element in which the risk of damaging one of the two elements that are to be attached to each other is reduced, and/or which allows for the sealing of a hole in an element through which it reaches.

This task is solved by the subject of Claim [sic] 1 and 11 and the device according to Claim 15 and by the use of a such an object according to Claim 10. Advantageous embodiments are reflected in the subsidiary claims and the description following below.

According to a first aspect, the invention departs from the underlying idea that to the familiar single-piece clip, an additional component can be added in the range of the head of such a clip, which can prevent damage to the elements that are to be connected with each other, and/or provide a sealing effect, and/or may bring additional positive effects, such as the generation of a preload force, for instance.

For these purposes, the invention provides a two-piece clip, comprising a first component having a head and a shaft extending from the head along a shaft axis fort with a point, wherein at least one protrusion is provided on the shaft, having a contact surface facing the head, and wherein the head has a contact surface facing the protrusion. The protrusion may be spring-preloaded in the direction perpendicular to the shaft axis. The protrusion may be movable in the direction perpendicular to the shaft axis. Furthermore, the invention provides for a second component for the two-piece clip, with a support surface facing the contact surface of the head, on which the contact surface of the head is supported, as well as a contact surface facing the protrusion. In the most simple embodiment, the second component may be embodied in the form of a washer, wherein it is not mandatory for the second component to have an opening through which the shaft would extend, even though this is proposed in a particularly preferred embodiment. It is also conceivable for the second component to be embodied in the form of a pad, assigned to a specific contact surface of the head. It is conceivable, for instance, that the head feature multiple contact surfaces, and in for each contact surface a component is provided with a support surface facing the respective contact surface of the head and supporting it, wherein the respective component features a contact surface facing the protrusion.

A "clip" for securing a first element to a second element is understood to mean a fastening device featuring at least one first contact surface and at least a second contact surface facing the first contact surface. The first contact surface is generally arranged on a fixed element of the fastening device provided, whereas the second contact surface is arranged on a springy element of the fastening device. Such fastening devices are meant to be inserted with a point into a recess, typically a hole, in the first element. The springy element supporting the second contact surface is pushed in during the insertion but bounces back into its starting position after having passed through the recess. Typically, the first element is embodied as a flat element, for instance as a disk or as a metal sheet that form part of a frame of vehicle. However, the first element may also feature a blind hole with a correspondingly selected indentation that allows the springy element to bounce back after it has passed a narrower part of the hole above the indentation. The second element may be attached to the first element by clamping, for instance when it is inserted between a head of the clip and a surface of the first element, and when the distance between the first contact surface, which is then arranged at the head of the clip, and the second contact surface of the clip is selected such that it can generate such a clamping effect, given a specific material strength of the first element and a specific material strength of the second element. It is further conceivable that the second element also features a hole and that the clip is guided with its point through both holes. It is also conceivable that the second element is attached to a head of the clip, the latter having, for instance, a hook or a fastening knob, or when the second element is simply glued, welded, or otherwise joined with the head of the clip. Moreover, this general understanding of a "clip" is further concretized for the first aspect the of present invention by the fact that in this case, the aforementioned second contact surface is the contact surface of the protrusion on the shaft facing the head, and the contact surface described above as the first contact surface is the contact surface arranged on the second component that faces the protrusion.

A head of such a clip is understood to mean a widening at one end of the clip. The head is generally provided in order to prevent the clip from being moved in its entirety through a hole in the first element. Often, the head is also designed to apply the force needed for inserting the clip into a hole in the first element onto the clip. For these purposes, the clip often has a flat surface facing away from the point.

In a preferred embodiment, the head is formed in a rigid manner, "rigid" being understood to mean that no part of the head is movable relative to another head, for instance by being springy. In an alternative embodiment, the head features a rigid base unit, on which springy elements are arranged that are part of the head, such as springy arms or screen-like sealing lips. In a preferred embodiment, the largest cross-sectional area of all cross-sectional areas of the head on planes perpendicular to the longitudinal axis of the clip is larger than the largest cross-sectional area of all cross-sectional areas of the shaft on planes perpendicular to the longitudinal axis of the clip.

The clip further features a point. In the context of this description, "point" is merely the term used for the end of the clip opposite the head. In a preferred embodiment, it is provided that a shaft of the clip extending from the head to the point tapers down towards the point. This, however, is not a necessary requirement. In the context of this description, a point can also be understood to be any form of an oblique end at the end of the shaft opposite the head. In a preferred embodiment, the point may end in the shape of a pyramid, a cone, a truncated pyramid, or a truncated cone. The point may also be formed by the ridge of a roof-shaped end portion of a shaft extending from the head to the point. This, however, is not a necessary requirement. The point may be formed by a single portion of the clip. In a preferred embodiment, however, the point is formed from multiple subsegments of the clip, for instance by the four crests of the arched bending segments 15 as shown in WO 2012/104250 A2, or the two crests of the arched segments of the embodiments shown in FIGS. 1, 2, 7, 8, 9, 10 of EP 2 404 067 B1.

Between the head and the point, the clip features a shaft that may be assembled from multiple parts. The clip has a longitudinal axis, extending from the head to the point. It is particularly preferred for the shaft to be longer in its longitudinal dimension from the head to the point than in a width dimension that is perpendicular to the longitudinal dimension. It is particularly preferred for the longitudinal axis (the shaft axis) of the clip to point in the longitudinal direction of the shaft. In a preferred embodiment, the clip is designed in a mirror-symmetrical manner with respect to a plane containing the longitudinal axis of the clip. In an alternative embodiment, the clip is designed in a rotationally symmetric manner such that there is at least one plane containing the longitudinal axis of the clip, in which by a rotation of 180° around the longitudinal axis, every portion of the clip located on one side of this plane can be made to cover an identically formed portion of the clip on the other side of this plane.

The clip according to the invention has a protrusion on the shaft. It is particularly preferred for the protrusion to have a resting position, in which it protrudes from a subsegment of the shaft, for instance from a side of the shaft, and from which the protrusion can be moved outward due to the application of force, particularly preferentially into a direction perpendicular to the shaft axis (longitudinal axis) or in a direction that is parallel to a line that is perpendicular to the shaft axis (longitudinal axis). It is particularly preferred for the protrusion to be connected with a springy element or with a part of a springy element, such that the protrusion must be moved out of its resting position through the application of force against an increasing spring force, and the spring force causes the protrusion to return to its resting position after the removal of the force that was applied. In a preferred embodiment, the resting position is the position in which the springy element does not exert any force. The resting position may, but does not have to, be defined by a stop against which the springy element pushes or pulls the protrusion. It is particularly preferred for the protrusion to be spring-preloaded in the direction perpendicular to the shaft axis (longitudinal axis). In a preferred embodiment, the springy element reaches across a recess in a side and/or in the transition from one side to a side wall extending from the side in the direction of an opposing side. In a preferred embodiment, the shaft features a second protrusion, which has a contact surface (clip surface) facing the head as well. It is particularly preferred for this second protrusion, too, to have a resting position, in which it protrudes from a subsegment of the shaft, for instance from a side of the shaft, and from which it can be moved outward due to the application of force, particularly preferentially into a direction perpendicular to the shaft axis (longitudinal axis) or in a direction that is parallel to a line that is perpendicular to the shaft axis (longitudinal axis). It is particularly preferred for the second protrusion to be connected with a springy element or with a part of a springy element, such that the protrusion must be moved out of its resting position through the application of force against an increasing spring force, and the spring force causes the protrusion to return to its resting position after the removal of the force that was applied. In a preferred embodiment, the resting position is the position in which the springy element does not exert any force. The resting position may, but does not have to, be defined by a stop against which the springy element pushes or pulls the protrusion. In a particularly preferred embodiment, this second protrusion is arranged is on a side of the shaft that is across from a side on which the first protrusion is arranged. In a particularly preferred embodiment, a total of four protrusions are provided, two on a first side of the shaft and two on an opposing side of the shaft, wherein all four protrusions are spring-preloaded in the direction perpendicular to the shaft axis, in particular preferably spring-preloaded outward, or respectively, are connected with springy elements or are part of springy elements, such that the respective protrusion must be moved out of its resting position through the application of force against an increasing spring force, and the spring force causes the protrusion to return to its resting position after the removal of the force that was applied. In a preferred embodiment, the resting position is the position in which the respective springy element does not exert any force. The resting position may, but does not have to, be defined by a stop against which the respective springy element pushes or pulls the respective protrusion.

In a preferred embodiment, the springy element featuring the protrusion has a bevel. The bevel may be oriented such that it tapers in the direction of the point. This makes it possible for the springy element to contact the edge of the hole of an element when the clip is inserted with its point into that hole, and to be pushed inward by this edge against the preloaded spring force.

In a preferred embodiment, the second component has an opening, with the shaft extending through it. As a result, the second component obtains a certain degree of fixation in terms of its relative position with respect to the first component. This specifically also facilitates the orientation of the second component relative to when the attachment of the one element to the other element is accomplished by means of the clip.

In a preferred embodiment, the second component is loosely movable on the shaft between a first position, in which the support surface abuts the contact surface of the head, and a second position. In the second position, an elevation or a protrusion of the second component may push—in a first embodiment—against the edge of a recess of the first component, specifically in the shaft of the first component. In a second, alternatives, or supplementary embodiment, the second component may pushes [sic] in the second position against an elevation of the shaft. This may serve as a security device for the second component. In one direction, the movement of the second component is limited by the abuttal of its support surface to the contact surface of the head. In the other direction, its movement is limited due to the fact that its elevation or protrusion pushes against the edge of a recess in the first component and/or pushes it against an elevation of the shaft. This elevation of the shaft may be an elevation provided specifically for the purpose of securing the second component, for instance in the form of a knob or a rib. Similarly, the protrusion that is already provided on the shaft anyway may form the elevation and limit the elevation of the second component in the direction away from the head. Securing the second component makes it possible to deliver the two-piece clip to end clients in an assembled condition. These could then use the clip immediately without having to go through a preliminary step of sliding the second component onto the shaft of the first component, when a second component is provided with an opening with the shaft extending through it.

In a preferred, alternative embodiment, the size of the opening in the second component and the cross section of the shaft in the area in which it extends through the opening are selected such that they create a press fit between the second component and the shaft in the area of the opening of the second component. Such a press fit may contribute to the generation of a sealing effect. A press fit in this area may also be produced by the second component having a sealing ring as a limiting border of its opening, or an elastic material having sealing effect.

In a preferred embodiment, the second component features a recess that receives the head. As mentioned above, in a very simple embodiment it is conceivable that the second component is formed as a simple washer. However, special advantages are achieved when the second component features a recess receiving the head. On the one hand, this may lead to an even better positioning of the second component relative to the first component. Furthermore, the inclusion of at least part of the head in a recess of the second component may cause edges or sharp protrusions of the head be covered, this preventing them from damaging the elements that are to be connected with the clip. The recess, in its three-dimensional form, can clearly be chosen to be larger than the three-dimensional form of the part of the head that is to be received by the recess. This can already achieve a protective effect against the damaging of the elements that are to be connected with each other. In a preferred embodiment, the three-dimensional form of the recess corresponds to the three-dimensional form of the part of the head that it is meant to receive; preferentially, the recess is the negative of the part of the head that it is meant to receive at least with respect to its outer contour. Thus, the position of the head relative to the second component is unambiguously defined. Furthermore, such an embodiment may contribute to the sealing. In order to fixate the head, it may suffice for the recess with to be the negative of the head received by it, at least in terms of its outer contours. The head may have indentations or recesses. In a preferred embodiment, these may be used for the design of the recess and replicated as negatives. However, in order to reach a positive, head-securing effect, it suffices if only the outer contour of the recess replicates the outer (enveloping) contour of the head.

In a preferred embodiment, the recess is formed so deep that when the contact surface of the head is supported on the support surface of the second component, the head does not protrude from the recess. In a preferred embodiment, the support surface of the second component is the bottom of the recess. This embodiment causes the head to disappear entirely in the second component, leaving it accessible only from above. This achieves a particularly good protection of the components that are to be connected with the clip.

In a preferred embodiment in which the second component features a recess receiving the head and in which the second component has an opening with the shaft extending through it, the opening of the second component extends away from the bottom of the recess.

In a preferred embodiment, the recesses and the head have a rectangular cross section. This can prevent a rotation of the head relative to the second component. In an alternative embodiment, the recesses and the head may have a circular, an elliptical, a triangular, or a polygonal cross section, wherein in a preferred embodiment, the cross section of the recess corresponds with the cross section of the head, such that in a preferred embodiment, the recess can receive the head without any play.

In a preferred embodiment, the first component and the second component are made of different materials. In a particularly preferred embodiment, the first component is made of metal, whereas the second component is not made of metal, it being particularly preferred that the second component be made out of a synthetic material. In this embodiment, the first component and the second component may perform various functions. The first component made out of metal gives the two-piece clip a particularly high degree of rigidity. The formation of the second component of a material other than metal may be used to give the second component attenuating or sealing functions, or a protective function with respect to the elements that are to be connected. In an alternative embodiment, the first component and the second component are made of the same material, with particular preference out of metal or with particular preference out of a synthetic material.

If the second component is made of a more elastic material than the first component, and with particular preference, of a more elastic material than the material used for the elements that are to be connected, the provision of the second component may also be used as a tolerance compensation for manufacturing tolerances. If the distance between the contact surface of the protrusion facing the head and the contact surface of the second component facing the protrusion is selected to be smaller than the total thickness of the first element and the second element if these are to be attached to each other by means of the clip according to the invention such that they can be arranged between these two contact surfaces, the second component is compressed when the fastening takes place, and is thus able to compensate manufacturing tolerances. Such an embodiment may also be used to shape the head of the first component in a rigid manner and without elastic arms arranged on the head, as they are known from WO 2012/104250 A1. The task of the springy arms of a head with respect to the generation of a contact force by means of which the two elements that are to be corresponding with each other are pressed against each other can also be realized in the clip according to the invention by means of a correspondingly elastic second component. A contact force may be used to generate a preload in the mounting condition. This may lead to the prevention of movements or sounds caused by external stimuli such as vibrations, oscillations, and relative movement.

In a preferred embodiment, the first component is produced from a metal sheet by bending. It has been demonstrated that such a production method is particularly suitable for the generation of a clip from metal.

In a preferred embodiment, the contact surface of the second component facing the protrusion is an annular contact surface surrounding the shaft axis. The ring may be either circular or have other annular forms, for instance the form of an elliptical ring or of a triangular or a rectangular or a polygonal ring. The embodiment of the contact surface of the second component facing the protrusion as a ring may be used with particular preference for sealing purposes. The contact surface of the second component facing the protrusion is generally the contact surface that is in contact with one of the two elements that are to be connected when these two elements that are to be connected are connected with each other by being brought in between the contact surface of the second component facing the protrusion and the contact surface of the protrusion of the first component. If, in a particularly preferred embodiment, both elements that are to be connected are provided with a hole through which the shaft of the first component of the two-piece clip is guided, an annular contact surface on the second component may be used for sealing when it surrounds the opening in the one of the two elements that are to be connected. The provision of an annular contact surface may also serve the purpose of applying a uniform contact force on the elements that are to be connected with each other.

However, it is not absolutely necessary for the contact surface of the second component facing the protrusion be an annular contact surface surrounding the shaft axis. The contact surface may also be a single, self-contained surface. It is also conceivable for the second component to feature multiple contact surfaces, specifically multiple self-contained contact surfaces, facing the protrusion or the protrusions, respectively.

In a preferred embodiment, the second component features an upper part with a recess for receiving the head, as well as a lower part. It is particularly preferred for the upper part and the lower part to be part of a single-piece element. It is particularly preferred for the upper part and the lower part to be separated by a separating wall, wherein the separating wall forms the bottom of the recess and features the support surface facing the contact surface of the head. In a preferred embodiment, the lower part features a recess as well, the bottom of which forms the separating wall [between the lower part and] the upper part. In a preferred embodiment, therefore, the recess of the lower part and the recess of the upper part open in different directions.

In a preferred embodiment, the lower part, as it extends away from the separating wall, is formed in a screen-shaped manner. In a preferred embodiment, the upper part features a rectangular cross section. The rectangular cross section may also retain its rounded corners. In a preferred embodiment, a screen-shaped lower part continues the rectangular cross section of the upper part in such a manner that every cross section of the lower part has a rectangular external circumference as well, or alternatively, has an external circumference that corresponds in its geometrical form, albeit not in its size, to the external circumference of the upper part, whereas the size increases from every section plane to the next section plane that is farther removed from the upper part, while the geometrical form of the external circumference of the cross section of the lower part is retained.

In a preferred embodiment, a screen-shaped lower part of the second component features reinforcement ribs. These reinforcement ribs may consist, for instance, of a material that is different from the material of the rest of the lower part of the second component, or they may differ from the other parts of the lower part of the second component in their material strength.

In the framework of this description, a surface is understood to face another surface when the surface normal of one surface intersects with the plane of the other surface. In the description of the present invention, a surface facing another surface does not require that one surface, if moved along its surface normal, can be caused to cover or overlap with the surface that it faces. In order to be considered mutually facing surfaces, it suffices in the framework of the present description, for instance, that the contact surface of the second component facing the protrusion is located on a plane that is perpendicular to the longitudinal axis (shaft axis) of the shaft and points in the direction of the point, whereas the contact surface of the protrusion of the shaft facing the head is also located on a plane that is perpendicular to the longitudinal axis (shaft axis) and faces in the direction of the point, without there being a need for the one surface to be arranged opposite the other surface. In a preferred embodiment, the mutually facing surfaces are arranged on parallel planes.

In a preferred embodiment, the head features multiple contact surfaces facing the protrusion, and the second component features multiple support surfaces, wherein each support surface faces a respective contact surface of the head, and each contact surface of the head is supported on a respective support surface of the second component. In this context, embodiments are also conceivable in which the support surface of the second component is selected to be larger than the contact surface of the head, and two contact surfaces of the head are supported on a single support surface of the second component, for instance.

In a preferred embodiment, the second component features multiple contact surfaces facing the protrusion. It is particularly preferred for at least one contact surface facing the protrusion to be arranged on one side of a plane containing the shaft axis, and for another contact surface facing the protrusion to be arranged on the other side of this plane.

In a preferred embodiment, all contact surfaces of the head are arranged on one plane.

In a preferred embodiment, all contact surfaces of the second component are arranged on one plane.

In a preferred embodiment, all support surfaces of the second component are arranged on one plane.

In a preferred embodiment, a contact surface of the second component facing the protrusion is arranged on a protrusion protruding from a base unit, for instance an upper part of the second component, that has a recess for receiving the head. The protrusion may consist of solid material. Similarly, the protrusion may take the form of a ridge or a bridge, or feature two shanks that meet in a point at which the contact surface of the second component facing the protrusion is arranged.

The head may feature recesses, and the remaining structure of the clip may be selected such that a tool, for instance a screw driver or a point, can be guided from above through the head to a springy element on which the protrusion is formed, wherein the opening in the head is chosen to be sufficiently large for allowing a movement of the tool in order to retract the springy element against its outward directed preload, and thus to retract the protrusion on the shaft in the direction of the middle of the shaft.

The second component may consist of two parts, specifically a first part featuring the support surface facing the contact surface of the head, on which the contact surface of the head is supported, and a second part, featuring the contact surface facing the protrusion. In a preferred embodiment, the first part of the second component is in a flexible connection with the second part of the second component. In a particularly preferred embodiment, the first part of the second component features an opening with the shaft extending through it, and/or the second part of the second component features an opening with the shaft extending through [it]. In a preferred embodiment, both parts respectively feature an opening with the shaft extending through [it], wherein the first part of the second component features on one of its sides a bent portion that is connected with one side of the second part of the second component, wherein this bent portion forms the flexible connection between the two parts. In a preferred embodiment, the first part and the second part of the second component are made of metal or of a synthetic material.

According to an additional aspect of the invention, which may also be combined with the previously described first aspect, a clip for securing a first element to a second element is proposed, wherein the clip features a head and a point and a first side and a second side, wherein the first side extends from the head in the direction of the point, and the second side extends from the head in the direction of the point, wherein a first side wall extends from the first side in the direction of the second side, wherein the head features a side surface and a contact surface facing the point, and in which the side surface of the head transitions into the contact surface of the head facing the point via a first rounded edge, and the first side transitions into the first side wall via a second rounded edge, and the first rounded edge transitions into the second rounded edge via an arched segment.

In a particularly preferred embodiment, in the previously described first aspect of the invention, the first component is designed such that the first component features a head and a point and a first side and a second side, wherein the first side extends from the head in the direction of the point, and the second side extends from the head in the direction of the point, wherein a first side wall extends from the first side in the direction of the second side, wherein the head features a side surface and a contact surface facing the point, and the side surface of the head transitions into the contact surface of the head facing the point via a rounded edge, and/or the first side transitions into the first side wall via a rounded edge.

The use of rounded edges avoids points, setbacks, and edges in this area, that might damage the elements that are to be connected. In particular in the embodiment, in which the side surface of the head transitions into the contact surface of the head facing the point via a first rounded edge, and the first side transitions into the first side wall via a second rounded edge, and the first rounded edge transitions into the second rounded edge via an arched segment, the risk of injury [sic] of the two elements that are to be connected can be strongly reduced.

In a preferred embodiment, the side surface of the head is aligned with the first side.

In a preferred embodiment, the rounded edge via which the first side transitions into the first side wall extends in a direction parallel to the longitudinal axis (shaft axis) of the clip, whereas the rounded edge via which the side surface of the head transitions into the contact surface of the head facing the point extends in a direction which is at an angle to—and with particular preference is perpendicular to—the direction in which the rounded edge via which the first side transitions into the first side wall extends. The rounded edge is designed with particular preference as an arch in a cross section perpendicular to the line in which the edge extends.

It is particularly preferred for the arched segment by way of which the first rounded edge transitions into the second rounded edge to be designed as a throat [sic].

In a preferred embodiment, the contact surface of the head facing the point transitions into the first side wall via an arched segment.

In what follows, additional features, specifically additional preferred features, of the clip (to the extent the clip is embodied as a single piece) or of the first component of the two-piece clip are described. For purposes of easier reference, only the term "clip" will be used, and unless it is explicitly specified otherwise, this term will also refer to the first component in case of the two-piece embodiment of the clip. For the two-piece embodiment, references below to a (preferred) property/to a (preferred) feature of the "clip" is to be understood as reference to a (preferred) property/to a (preferred) feature of the first component.

In a preferred embodiment, the clip, or respectively, the first component, has a first side, which extends from the head in the direction of the point. The clip features a shaft consisting of one, or alternatively, of several elements of the clip. In a preferred embodiment, this shaft has a first side, extending from the head in the direction of the point. This shaft further has a second side, extending from the head in the direction of the point. In a particularly preferred embodiment, the first side extends from the head to the point, wherein portions of the clip contributing to the form of the point connect at the point end of the first side. In a particularly preferred embodiment, the second side extends from the head to the point, wherein portions of the clip contributing to the form of the point connect at the point end of the second side. However, other constructions are also conceivable, in which the shaft of the clip starts from the head with a first side and a second side, each of which extending in the direction of the head, but then, other portions of the clip are provided between the first side and the segments of the clip forming the point, pointing in different directions, specifically relative to the direction of the first side, and/or other portions of the clip are provided between the second side and the segments of the clip forming the point, pointing in different directions, specifically relative to the direction of the second side.

In a preferred embodiment, the first side wall and the second side wall are aligned with each other. The term 'aligned' is with particular preference understood to mean that the first side wall has an outward facing surface, that the second side wall has an outward facing surface, and that the outward facing surface of the first side wall and the outward facing surface of the second side wall are arranged on one plane. In a preferred embodiment, the first side wall and the second side wall are arranged on the same side of a plane that contains the longitudinal axis of the clip.

In a preferred embodiment, the clip according to the invention has a first side wall extending from the first side in the direction of the second side. In a particularly preferred embodiment, the clip has a third side wall that also extends from the first side in the direction of the second side, the first side wall extending from a first edge of the first side in the direction of the second side, and the third side wall extending from a second edge of the first side opposite the first edge in the direction of the second side. In a particularly preferred embodiment, the clip has a fourth side wall that also extends from the second side in the direction of the first side, the second side wall extending from a first edge of the second side in the direction of the first side, and the fourth side wall extending from a second edge of the second side opposite the first edge in the direction of the first side. In a preferred embodiment, the third side wall and the fourth side wall are aligned with each other. The term 'aligned' is with particular preference understood to mean that the third side wall has an outward facing surface, that the fourth side wall has an outward facing surface, and that the outward facing surface of the third side wall and the outward facing surface of the fourth side wall are arranged on one plane. In a preferred embodiment, the first side wall is arranged in parallel to the third side wall and/or the second side wall is arranged in parallel to fourth side wall.

As explained above, the clip may be embodied in a mirror-symmetrical manner with respect to a plane containing the longitudinal axis of the clip. In such an embodiment, the third side wall is designed like the first side wall, and the fourth side wall is designed like the second side wall, such that the following explanations of features of the first side wall are also explanations of features of the third side wall, and the following explanations of features of the second side wall are also explanations of features of the fourth side wall. As previously stated, the clip may also be designed in a rotationally symmetric manner, such that there is at least one plane containing the longitudinal axis of the clip, in which by a rotation of 180° around the longitudinal axis, every portion of the clip located on one side of this plane can be made to cover an identically formed portion of the clip on the other side of this plane. In such an embodiment, the third side wall is designed like the second side wall, and the fourth side wall is designed like the third side wall, such that the following explanations of features of the first side wall are also explanations of features of the fourth side wall, and the following explanations of features of the second side wall are also explanations of features of the third side wall.

In the description, the interior of the clip is understood to mean the area immediately surrounding the longitudinal axis (shaft axis) of the clip, and/or if available, the space enclosed by the first side, the second side, and the first side wall, and the second side wall, and, if available, by the third side wall and the fourth side wall. To the extent that this description refers to outward facing surfaces or the "outward" concept is otherwise used, a direction is meant that points away from the longitudinal axis of the clip.

In a preferred embodiment, the first side wall of the clip features a first protruding finger that overlaps with an area of the second side wall, as well as a second protruding finger that overlaps with another area of the second side wall. In the context of this description, a finger is understood to overlap with an area of a side wall if at least a part of the finger is arranged such that it intersects with a surface normal of a surface of this area and/or if a line that is perpendicular to a longitudinal axis of the finger intersects with the area of side wall. For the success of the invention it is not absolutely necessary that a surface of the finger be in contact with a surface of the area of the side wall that is overlapped by the finger. In a preferred embodiment, however, a surface of the finger is in contact with the surface of the area of the side wall that it overlaps with.

In a preferred embodiment, the length of the finger is greater than the width of the finger, wherein the length is understood to mean the extent of the finger from the first side wall in the direction of the second side wall. In addition to a width that is perpendicular to the length, the finger is particularly preferred to have a height, generally determined by the material strength, which can also be referred to as thickness. In a preferred embodiment, the width of the finger is greater than the height (thickness) of the finger. In a preferred embodiment, the width dimension of the finger is parallel to longitudinal axis of the clip, and/or the longitudinal dimension of the finger is perpendicular to the longitudinal axis or perpendicular to a line that is parallel to the longitudinal axis.

In a preferred embodiment, the first side wall has a base unit, from which the first protruding finger protrudes, or the second protruding finger protrudes. It is particularly preferred for the base unit to have a length; a length specifically being understood to mean the extent of the base unit from the first side in the direction of the second side. In a preferred embodiment, the first side transitions into the first side wall via an edge. In this case, length is specifically understood to mean the maximum extent of the base unit from this edge in the direction of the second side. Additionally or alternatively, the length dimension of the base unit is perpendicular to the longitudinal axis of the clip, or perpendicular to a line that is parallel to longitudinal axis of the clip. It is particularly preferred for the base unit to also have a width, which is particularly preferred a extend in a direction parallel to longitudinal axis of the clip. The base unit further has a height that may also be referred to as thickness, and which is generally determined by the material strength. In a preferred embodiment, the width of the base unit is greater than the length of the base unit.

In a preferred embodiment, the width of the first protruding finger and/or the width of the second protruding finger is smaller than the width of the base unit. In a preferred embodiment, the width of a protruding finger is smaller than one half of the width of the base unit, with particular preference it is smaller than one third of it, and with particular preference it is smaller than one quarter of the width of the base unit.

In a preferred embodiment, the width of the first protruding finger is equal to the width of the second protruding finger. In a preferred embodiment, the distance from the end of the first protruding finger to the second side is equal to the distance from the second protruding finger to the second side.

In a preferred embodiment the width of the base unit of the first side wall and/or the width of the base unit of the second side wall is greater than 40%, with particular preference greater than 50%, specifically greater than 60%, with particular preference greater than 70%, and with particular preference greater than 80% of the length of the shaft of the clip.

In a preferred embodiment, the length of the protruding finger is smaller than the maximum length of the base unit. In an alternative embodiment, the length of the protruding finger is equal to the maximum length of the base unit.

In an alternative embodiment, the length of the protruding finger is greater than the maximum length of the base unit.

In a preferred embodiment, the first side transitions into the first side wall via an edge, this edge being interrupted by a recess. In a preferred embodiment, an element of the clip that is spring-preloaded in an outward direction extends from the inside outward through the recess. A preload in an outward direction is also understood to mean an embodiment in which the preloaded element has a resting position in which it protrudes from a subsegment of the shaft, for instance a side of the shaft, and from which it can be moved outward by application of force, with particular preference in a direction perpendicular to the shaft axis (longitudinal axis), or in a direction that is parallel to a line that is perpendicular to the shaft axis (longitudinal axis). It is particularly preferred for the preloaded element to be connected with a springy element or with a part of a springy element, such that it must be moved out of its resting position through the application of force against an increasing spring force, and the spring force causes the protrusion to return to its resting position after the removal of the force that was applied. In a preferred embodiment, the resting position is the position in which the springy element does not exert any force. The resting position may, but does not have to, be defined by a stop against which the springy element pushes or pulls the preloaded element. In a preferred embodiment, the second side transitions into the second side wall via an edge, this edge being interrupted by a recess. In a preferred embodiment, an element of the clip that is spring-preloaded in an outward direction extends from the inside outward through the recess.

In a preferred embodiment, the first side transitions into the first side wall via an edge, the edge extending in a direction parallel to the longitudinal axis of the clip. In a preferred embodiment, the second side transitions into the second side wall via an edge, the edge extending in a direction parallel to the longitudinal axis of the clip.

In a preferred embodiment, the area of the second side, above which the first protruding finger overlaps with the first side wall, is adjacent to the area of the second side, above which the second protruding finger overlaps with the first side wall. It is particularly preferred for the first protruding finger of the first side wall and the second protruding finger of the first side wall to be arranged next to each other.

It is particularly preferred for the first protruding finger of the first side wall to be closer to a first end of a base unit of the first side wall (seen in the lateral dimension of the side wall) than to an opposing second end of the base unit. It is particularly preferred for the first end to be the end of the base unit closer to the head. Additionally or alternatively, the second protruding finger of the first side wall is closer to the second end of the base unit of the first side wall (in width dimension the side wall seen) than to the opposing first end of the base unit. It is particularly preferred for the second end to be the end of the base unit closer to the point.

In a preferred embodiment, the first side wall has a flat base unit. In a preferred embodiment, the second side wall has a flat base unit. A flat base unit is understood with particular preference to be a base unit having a flat external surface, with particular preference one that is arranged on a plane. It is particularly preferred for the flat base unit also to have a uniform height (thickness). It is conceivable that a flat base unit described here as flat features bulges, for instance small knobs or guiding ribs, or indentations or dents. In the present description, a base unit featuring deliberately selected singular deviations from a geometrically pure flat shape is still understood to be a flat base unit. If the flat base unit deliberately features a selected singular deviation from a geometrically pure flat shape, such as bulges, for instance, or small knobs, guiding ribs, indentations, or dents, in a preferred embodiment, the surface occupied by the singular deviation on the plane that contains the otherwise geometrically flat surface of the base unit is smaller than 30%, with particular preference smaller than 20%, with particular preference smaller than 10%, of the remaining geometrically flat surface. If the flat base unit deliberately features multiple selected singular deviations from a geometrically pure flat shape, such as bulges, for instance, or small knobs, guiding ribs, indentations, or dents, in a preferred embodiment, the surface respectively occupied by each singular deviation in the plane that contains the otherwise geometrically flat surface of the base unit is smaller than 30%, with particular preference smaller than 20%, with particular preference smaller than 10%, of the remaining geometrically flat surface. If the flat base unit deliberately features multiple selected singular deviations from a geometrically pure flat shape, such as bulges, for instance, or small knobs, guiding ribs, indentations, or dents, in a preferred embodiment, the sum of all the surfaces occupied by the singular deviation [sic] in the plane that contains the otherwise geometrically flat surface of the base unit is smaller than 30%, with particular preference smaller than 20%, with particular preference smaller than 10%, of the remaining geometrically flat surface. In a preferred embodiment, the flat base unit is also entirely flat in the geometrical meaning, featuring no singular deviation from the geometrically pure flat shape at all.

In a preferred embodiment, the first finger is aligned with a flat base unit of the first side wall. It is particularly preferred for the outward facing surface of the finger to be on one plane with the outward facing surface of the base unit. In a preferred embodiment, the protruding finger also has the same material strength (thickness; height) as the base unit. It is particularly preferred that there be no bending segment between the base unit and the first protruding finger.

In a particularly preferred embodiment, the first side wall features a flat base unit, the second protruding finger having an arched segment curved outward or inward. In a preferred embodiment, the second protruding finger has an end portion that is parallel to the flat base unit. This is with particular preference understood to mean that the end portion of the second finger has an outward facing surface on a plane that is parallel to the plane of the outward facing surface of the base unit. It is particularly preferred for the end portion of the second protruding finger to also have the same material strength as the base unit. In a preferred embodiment, a bending segment is located between the base unit and the end portion of the second finger. It is particularly preferred for the bending segment to be formed as a double bend, first bending into a first direction and then another direction.

In a preferred embodiment, the second side wall has a recess for receiving the first protruding finger. A recess is particularly understood to mean a dent in a base unit of the second side wall or a portion of the side wall extending in parallel to, but also at a parallel offset from, a flat base unit in the side wall, wherein the transition between the flat base unit and the portion is preferably formed by a throat. In a particularly preferred embodiment, the first protruding finger of the first side wall aligns with a flat base unit of the second side wall. In order to allow in such an embodiment an overlap of the first protruding finger of the first side wall with an area of the second side wall, the area of the second side wall with which a thus designed first protruding finger of the first side wall is overlapping is formed by a recess of the second base unit shaped as a setback or pocket or as a dent.

In a preferred embodiment, the second side wall has at least one protruding finger overlapping with an area of the first side wall. In a preferred embodiment, the protruding finger of the second side wall is formed like the second protruding finger of the first side wall.

In a preferred embodiment, the first side wall has a flat base unit, this base unit having a narrow side facing the first side of the second side wall, the second side wall having a flat base unit feature, this base unit having a narrow side facing the second side wall [sic] of the first side wall. In a preferred embodiment, the narrow side of the base unit extends at a right angle to an outward facing surface of the base unit. In this preferred embodiment, the narrow side of the first side wall and/or the narrow side of the second side wall is formed at least partially as a plane. In a preferred embodiment, the narrow side of the first side wall extends on a plane that is parallel to the longitudinal axis or that contains the longitudinal axis of the clip and/or the narrow side of the second side wall of a plane that is parallel to the longitudinal axis or that contains the longitudinal axis of the clip.

In a preferred embodiment, the first protruding finger overlaps with an area of the base unit of the second side wall that is adjacent to the plane narrow side of the second side wall, and/or the second protruding finger overlaps with an area of the base unit of the second side wall that is adjacent to the plane narrow side of the second side wall.

In a preferred embodiment, the first side wall features a flat base unit and a narrow side that is plane in a first portion, wherein the plane portion of the narrow side extends in a direction that is parallel to the longitudinal axis of the clip. In this embodiment, the base unit features adjacent to the plane portion of the narrow side a protrusion protruding in the direction of the second side wall. In a preferred embodiment, the protrusion engages a setback that is provided in the second side wall. In a preferred embodiment, the second side wall features a flat base unit and a narrow side that is plane in a first portion, wherein the setback is adjacent to the plane portion of the narrow side. Additionally or alternatively, the second side wall features a flat base unit and a narrow side that is plane in a first portion, wherein the plane portion of the narrow side extends in a direction that is parallel to the longitudinal axis of the clip. In this embodiment, the base unit features a protrusion adjacent to the plane portion of the narrow side, protruding in the direction of the first side wall. In a preferred embodiment, the protrusion engages a setback that is provided in the first side wall. In a preferred embodiment, the first side wall features a flat base unit and a narrow side that is plane in a first portion, wherein the setback is adjacent to the plane portion of the narrow side. These protrusions are not protruding fingers, because they do not overlap with an area of the opposing side wall. Through this interaction between protrusions and setbacks on the narrow sides of the base units of the side walls, an interlock may be generated that increases the rigidity of the clip, because it prevents relative movements of the base unit of the side walls in the direction parallel to the longitudinal dimension of the clip.

In a preferred embodiment, an arch is provided at one end of the first side, wherein the crest of the arch forms a part of the point of the clip at the end of the first side, and/or an arch is provided at one end of the second side, wherein the crest of the arch forms a part of the point of the clip at the end of the second side. Starting from the side, the arch may be designed going inward, as provided, for instance in the bending segment 15 of WO 2012/104205 A1. Similarly, the arch may be curved outward.

In a preferred embodiment, the first side has a flat base unit extending from the head in the direction of the point, and the first side wall has a flat base unit positioned at an angle to the flat base unit of the first side, with particular preference for an angle between 45° and 135°, with particular preference for an angle of 90°.

In a preferred embodiment, the second side has a flat base unit extending from the head in the direction of the point, and the second side wall has a flat base unit positioned at an angle to the flat base unit of the second side, with particular preference for an angle between 45° and 135°, with particular preference for an angle of 90°.

In a preferred embodiment, the flat base unit of the first side is oriented in parallel to the flat base unit of the second side. In a preferred embodiment, the clip features a first side with a flat base unit, a second side, oriented in parallel to the first side, with a flat base unit, a first side wall with a flat base unit, extending at an angle from the first side to the second side, a second side wall with a flat base unit, extending from the second side in the direction of the first side, the first side wall being aligned with the second side wall, as well as a third side wall with a flat base unit, extending at an angle from the first side to the second side, and a fourth side wall with a flat base unit, extending from the second side in the direction of the first side, the third side wall being aligned with the fourth side wall. Such an embodiment may feature in a cross section perpendicular to the longitudinal axis of the clip a cross section in the form of a rectangular ring, which is only interrupted by a gap between the first side wall and the second side wall and by a gap between the third side wall and the fourth side wall.

In a preferred embodiment, the head of the clip features a head surface facing the clip surface. In a particularly preferred embodiment, the clip surface is parallel to the head surface when the springy element is in its starting situation, in other words, is spring-loaded outward. In a preferred embodiment, the head surface is formed on a fixed area of the head. In an alternative embodiment, the head features springy arms capable of bouncing in a dimension that is parallel to the longitudinal dimension of the clip, wherein the head surface is arranged on a portion of the arm, preferably on an end portion of the arm.

In a preferred embodiment, the head and the first side and the first side wall and the second side and the second side wall are all part of a single-piece element, generated by bending segments of a piece of metal. It is also conceivable to manufacture the clip according to the invention out of a synthetic material, for instance by means of injection molding.

The clip according to the invention is used with particular preference for securing an element (the second element) to a part of a body (the first element) of a vehicle, with particular preference the frame of a vehicle. It is particularly preferred for the clip to be used for securing a panel (the second element) to the frame of a vehicle (the first element). It is preferred in particular for the clip to be used for securing an airbag to a part of the body of a vehicle, with particular preference to a frame of a vehicle.

The device according to the invention features a first element and a second element attached to the first element, the first element featuring a hole, and the second element being attached to the first element by means of a clip according to the invention, wherein the clip reaches across the hole in such a manner that the head of the clip, and if available, the second component of the clip, is arranged on one side of the first element, and the point of the clip is arranged on the opposite side of the element. In a preferred embodiment, the clip reach across the hole in such a manner that the head of the clip, and is available, the second component of the clip, is arranged on one side of the first element, and a clip surface (a contact surface of the protrusion of the shaft) of the clip is arranged on the opposite side of the element. In a preferred embodiment, the first element is a part of the body of a vehicle, preferably a frame of a vehicle. In a preferred embodiment, the second element is a panel or an airbag.

BRIEF DESCRIPTION OF THE SEVERAL VIEWS OF THE DRAWINGS

In what follows, the invention is further explained based on a drawing showing only exemplary embodiment [sic] of the invention.

The figures show as follows.

DETAILED DESCRIPTION OF THE INVENTION

Figure 2:
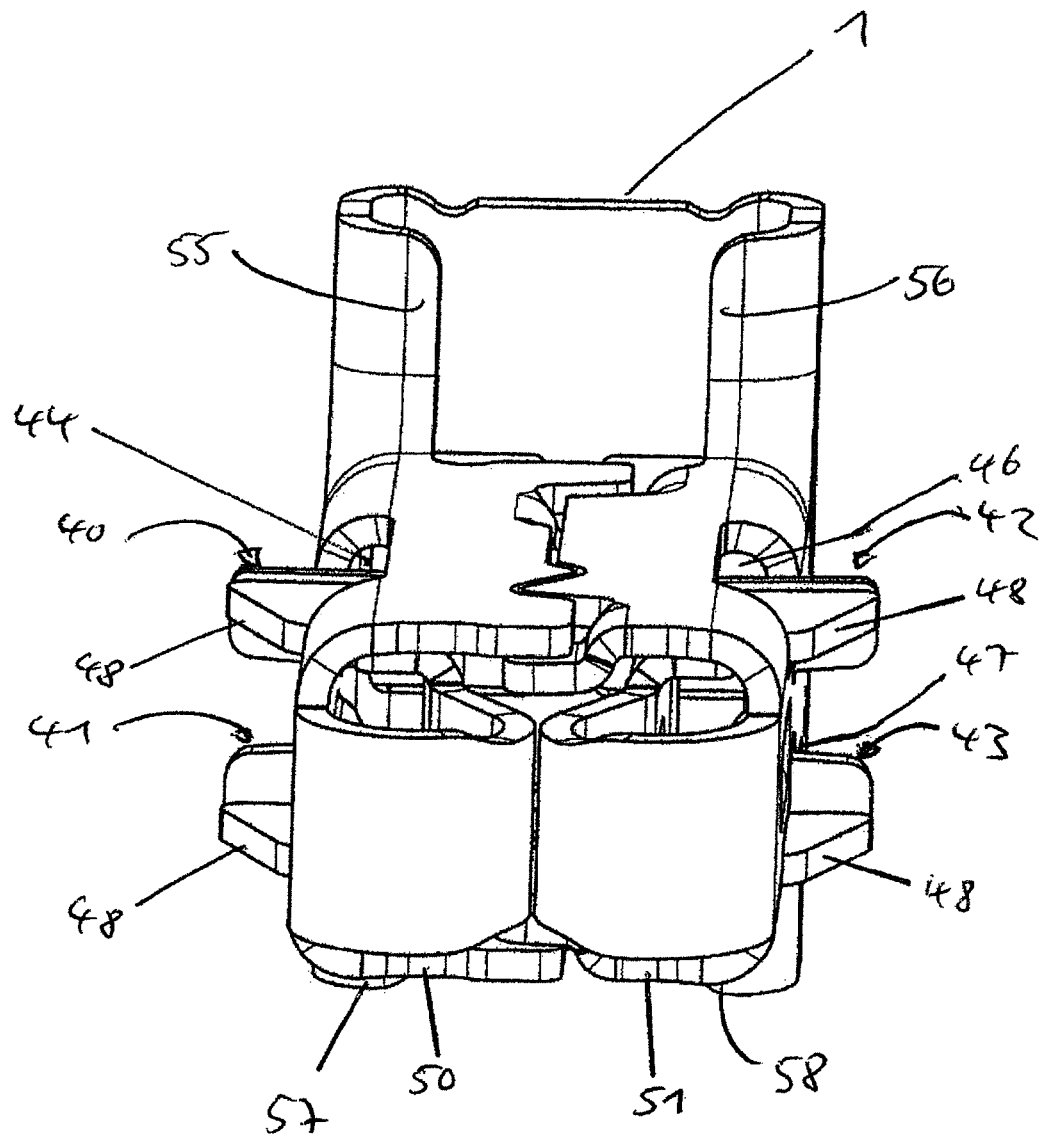
FIG. 2 a perspective view from below of the point of the single-piece clip.

The clip for securing a first element to a second element illustrated in FIG. 2 features a head 1 and a point 2. A shaft 3, assembled from multiple subsegments, extends between the head 1 and the point 2.

The shaft 3 features a first side 4 and a second side 5, arranged opposite of the first side 4 in terms of the longitudinal axis A of the clip, and extending parallel to the first side 4. Both the first side 4 and the second side 5 extend from the head 1 in the direction of the point 2. The first side 4 ends in an arched bending segment 6, which is curved inward departing from the first side 4. The crest of the arch of the bending segment 6 forms a part of the point 2. The second side 5 ends in an arched bending segment 7, which is curved inward. The crest of the arch of the bending segment 7 forms of a part of the point 2 of the clip.

The first side 4 transitions into the flat base unit 9 of a first side wall 10 via an edge 8, the first side wall extending from the first side 4 in the direction of the second side 5. The second side 5 transitions into the flat base unit 12 of a first side wall 13 via an edge 11, the first side wall extending from second first side 5 in the direction of the first side 4.

The clip shown in the figures is constructed in a mirror-symmetrical manner with respect to a plane containing the longitudinal axis A and extending parallel to the base unit 9 and the base unit 12. From the side 4, therefore a third side wall 50 (not shown in FIG. 1) extends in the direction of the second side 5, the third side wall 50 being designed to correspond to the first side wall 10. Furthermore, from the second side 5, a fourth side wall 51 (not shown in FIG. 1) extends in the direction of the first side 4, the fourth side wall 51 being designed to correspond to the first side wall 13. The clip according to the invention in the embodiment shown in the figures is a single-piece element generated by bending segments of a piece of metal.

The first side wall features a first protruding finger 14 overlapping with an area of the second side wall 13. For these purposes, the second side wall 13 features the recess in the form of a dent 15 that is more clearly visible in FIG. 3. The first side wall 10 also features a second protruding finger 16 (cf. FIG. 3). This second protruding finger 16 of the first side wall 10 overlaps with another area of the second side wall 13. The first protruding finger 14 of the first side wall is designed to align here with the flat base unit 9 of the first side wall, whereas the second protruding finger 16 is curved inward, engaging the second side wall 13. For these purposes, the second finger 16 features a bending segment 18 between the flat base unit 9 and the end portion 17 of the second finger 16, which is initially curved inward and then curved in the opposite direction, such that the end portion 17 of the finger 16 extends in parallel to the base unit 12 of the second side wall 13. The second side wall 13 features a protruding finger 19 overlapping with an area of the first side wall 10. The protruding finger 19 of the second side wall 13, is formed similarly to the second protruding finger 16 of the first side wall and features an end portion 20 that extends in parallel to the base unit 9 of the first side wall, as well as a bending segment 21, provided between the base unit 12 of the second side wall 13 and the end portion 20.

The base unit 9 of the first side wall 10 features a narrow side 25. The base unit 12 of the second side wall 13 features a narrow side 26. The narrow side 25 and the narrow side 26 are designed on a plane via a first portion, and within this portion they are substantially arranged parallel to each other, the plane portion of the narrow side 26 of the second side wall 13 being longer than the plane portion of the narrow side 25 of the first side wall 10. The second protruding finger 16 overlaps with an area of the base unit 12 of the second side wall 13, which is adjacent to the plane portion of the narrow side 26 of the second side wall. In the area, in which the second protruding finger 16 engages the base unit 12 of the second side wall 13, it features a plane portion of the narrow side 26. As in particularly clear in FIG. 1 and FIG. 2, a profile consisting of protrusions 27, 28 and recesses 29, 30 is adjacent to the plane portion of the narrow side 25 and to the plane portion of the narrow side 26. The respective protrusion 27, 28 of the respective side wall 10, 13 engages a setback 30, 29 here of the opposing side wall 13, 10. The protrusions 27, 28 are designed such that they do not overlap with an area of the opposite side wall, but merely engage the setbacks 29, 30 arranged on it.

Figure 1:
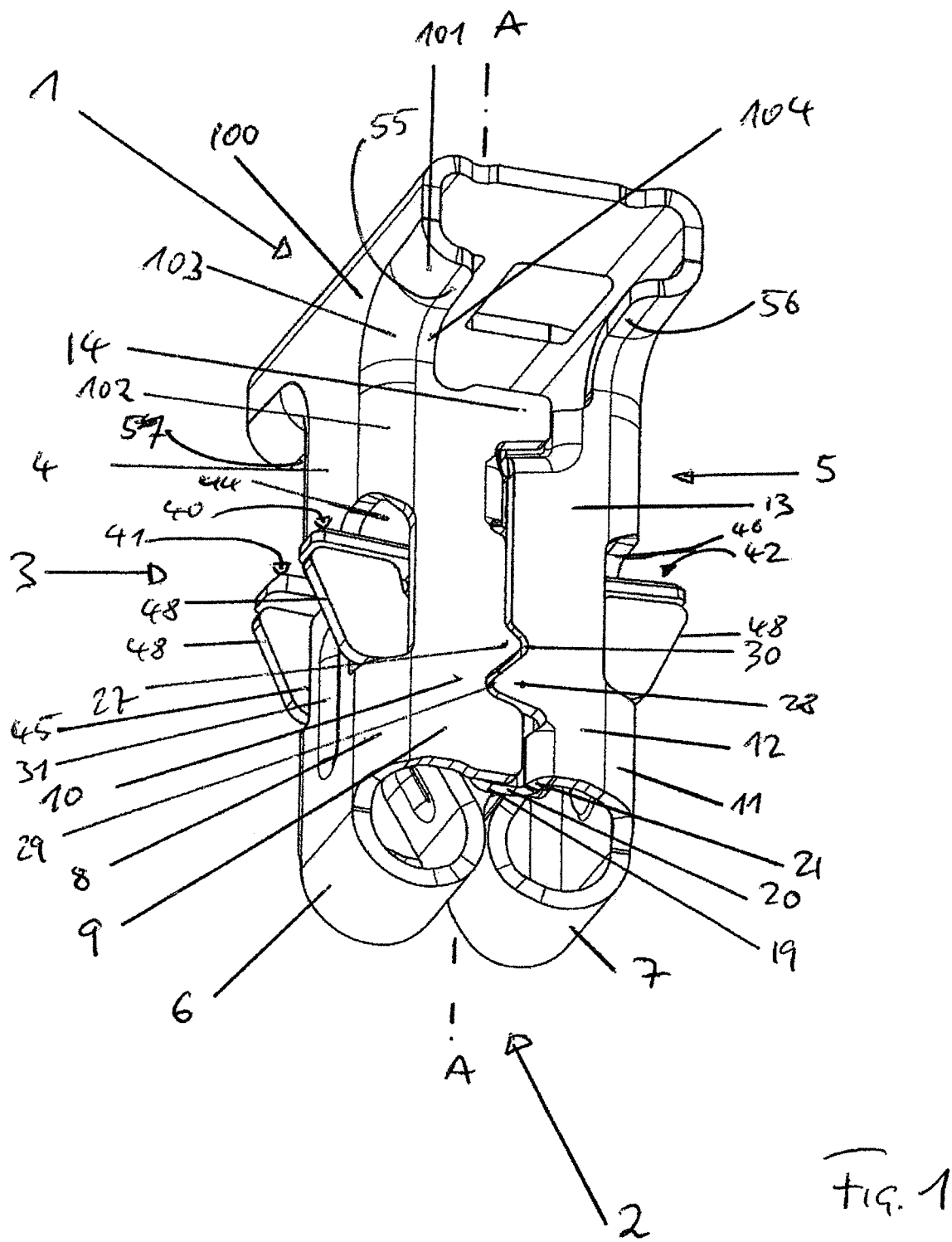
FIG. 1 a perspective side view from diagonally below of a single-piece clip according to the invention.

In the exemplary embodiment shown in the figures, the first side 4 and the second side 5 respectively feature a flat base unit. In FIG. 1, it is apparent that the otherwise flat base unit 4 features a small elevation 31. This is clarified by the understanding in the framework of this description of the concept of a "flat base unit", which only provides for a geometrically entirely flat base unit in a particularly preferred embodiment, whereas in other embodiments, as in the present one, also described such base unit as "flat base units" that deviate from a geometrically entirely flat shape due to small protrusions.

In the exemplary embodiment shown in the figures, the flat base unit of the first side 4 is at an angle of 90 degrees to the flat base unit 9 of the first side wall 10. The flat base unit of the second side 5 is at an angle of 90 degrees to the flat base unit 12 of the second side wall 13. The first side wall 10 and the second side wall 13 are aligned with each other (their outward facing surfaces being on one plane). The embodiment shown in the figures features four clip surfaces 40, 41, 42, 43. The respective clip surface is part of a springy element that penetrates through respective recesses 44, 45, 46, 47 located in the transition between the side 4, 5 and the first side surface 10, the second side surface 13, the third side surface 50, and the fourth side surface 51. The respective elastic element features a bevel 48, which causes the absent element to come into contact with the edge of the hole when the clip is inserted into a hole of an element and pushed inward contrary to the spring force when the clip is inserted deeper but is bounced back outward by the spring force after having passed through the hole in the element, thus engaging the respective element.

The clip surfaces 40, 41, 42, 43 face the head 1. The head features four head surfaces 55, 56, 57, 58 facing the clip surfaces 40, 41, 42, 43. The first element and the second element are held between the clip surfaces 40, 41, 42, 43 and the head surfaces 50, 56, 57, 58, thus attaching the second element to the first element.

The head 1 features a side surface 100 and the contact surface (head surface) 55 facing the point 2, wherein the side surface 100 of the head transitions into the contact surface 55 of the head facing the point 2 via a first rounded edge 101, the first side 3 transitions into the first side wall 10 via a second rounded edge 102, and the first rounded edge 101 transitions into the second rounded edge 102 via an arched segment 103. The contact surface 55 of the head 1 facing the point 2 transitions into the first side wall 10 via an arched segment 104.

Figure 19:
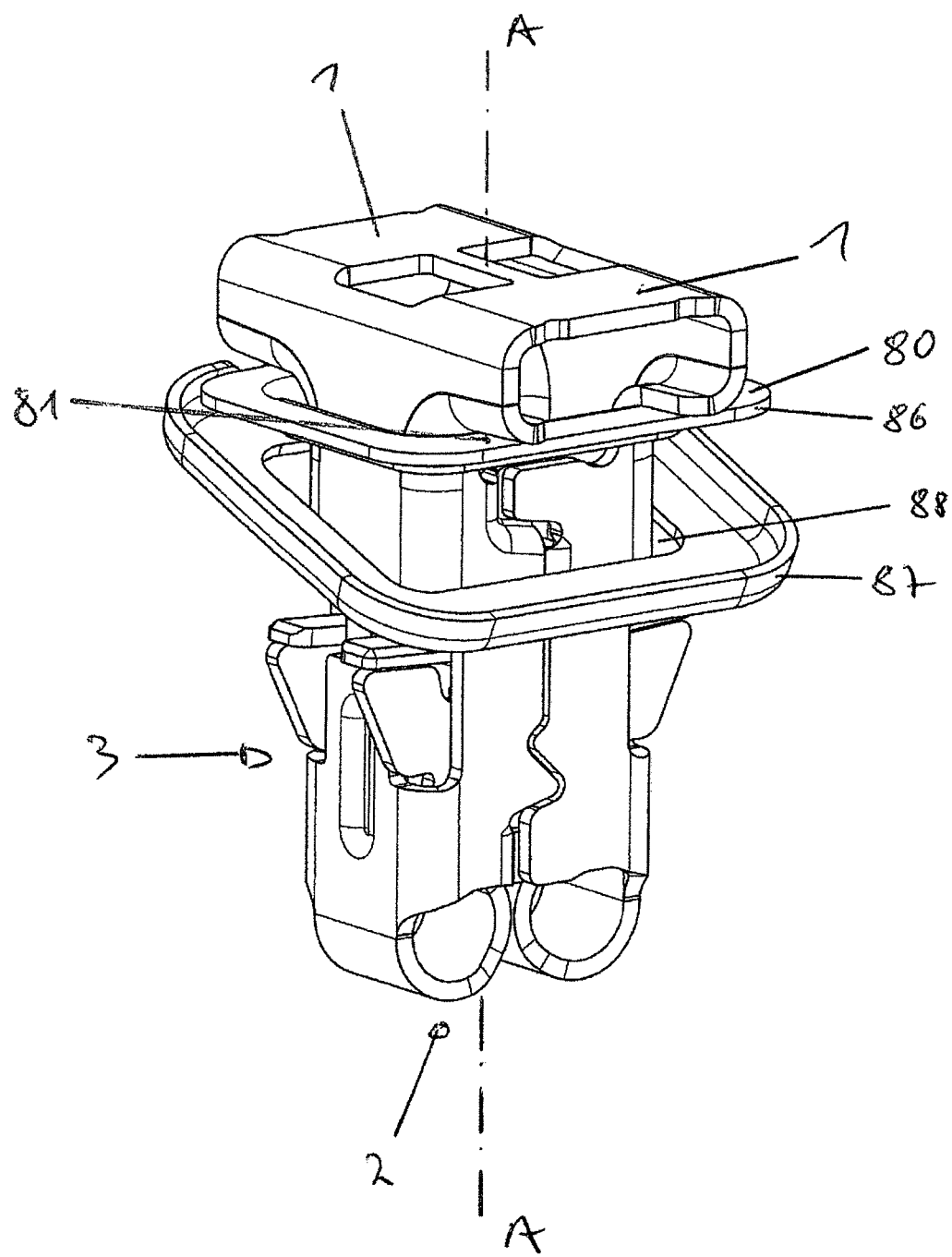
FIG. 19 a perspective oblique top view of a third embodiment of a two-piece clip according to the invention, wherein the second component of the two-piece clip according to the invention is shown in a transparent manner, and FIG. 20 a side view of the clip according to FIG. 115 [sic]
Figure 20:
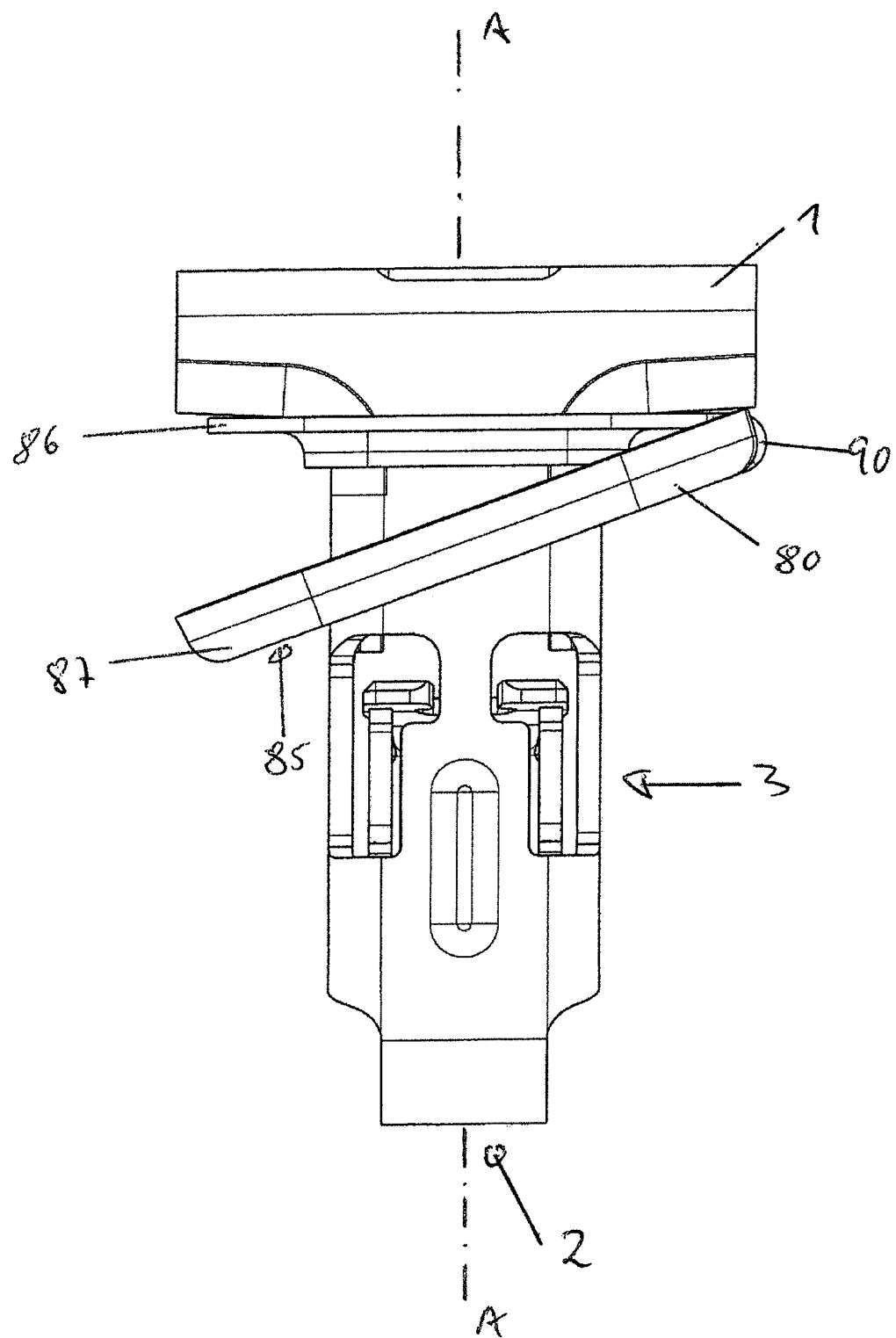

In what follows, three embodiments of a two-piece clip according to the invention are described, specifically a first embodiment based on FIGS. 4 through 11, a second embodiment based on FIGS. 12 through 18, and a third embodiment based on FIGS. 19 and 20. All three two-piece embodiments share the characteristic of their first component being a single-piece clip as previously described based on FIGS. 1 through 3.

Figure 3:
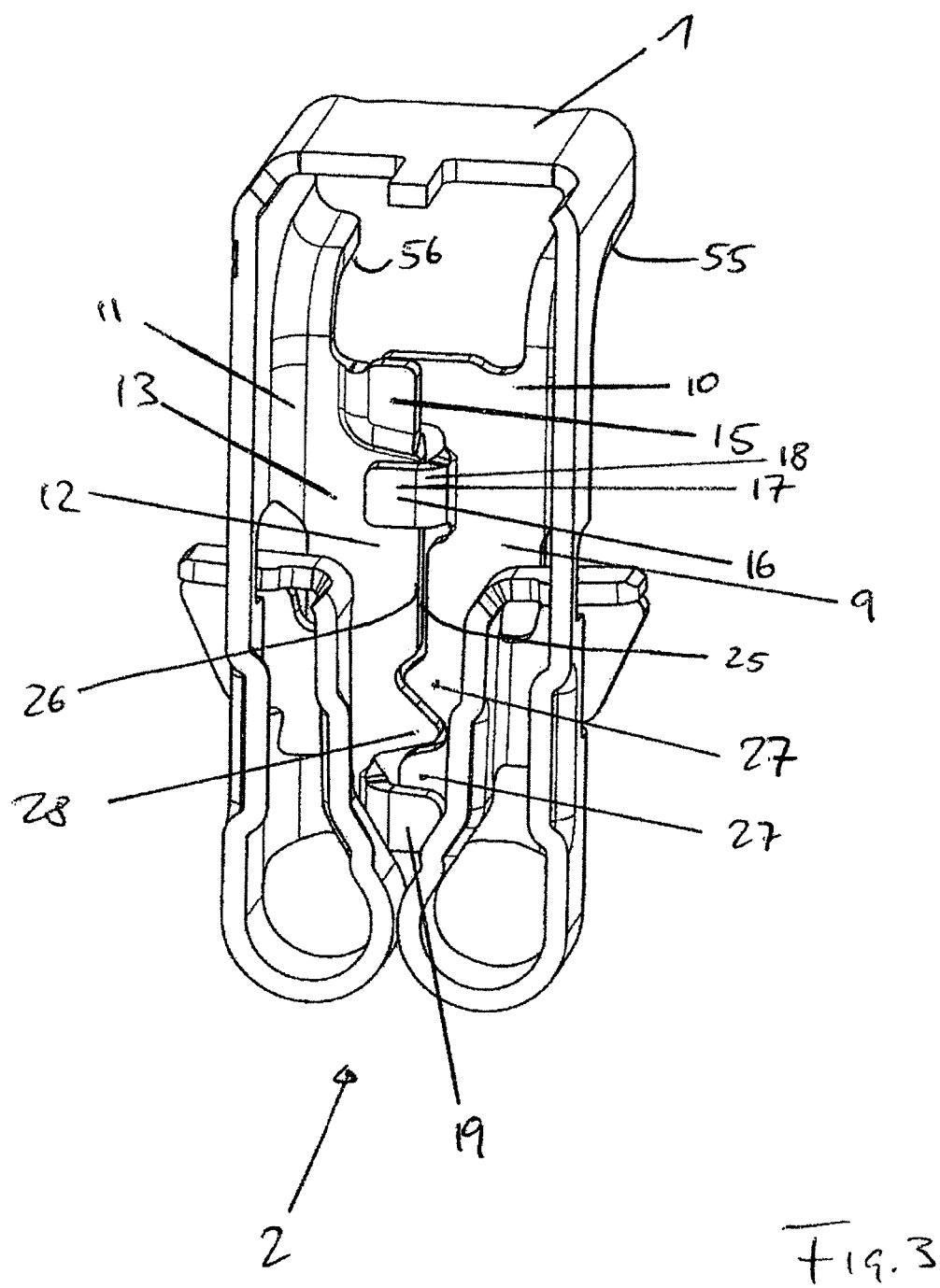
FIG. 3 a cutaway perspective side view of the single-piece clip.
Figure 4:
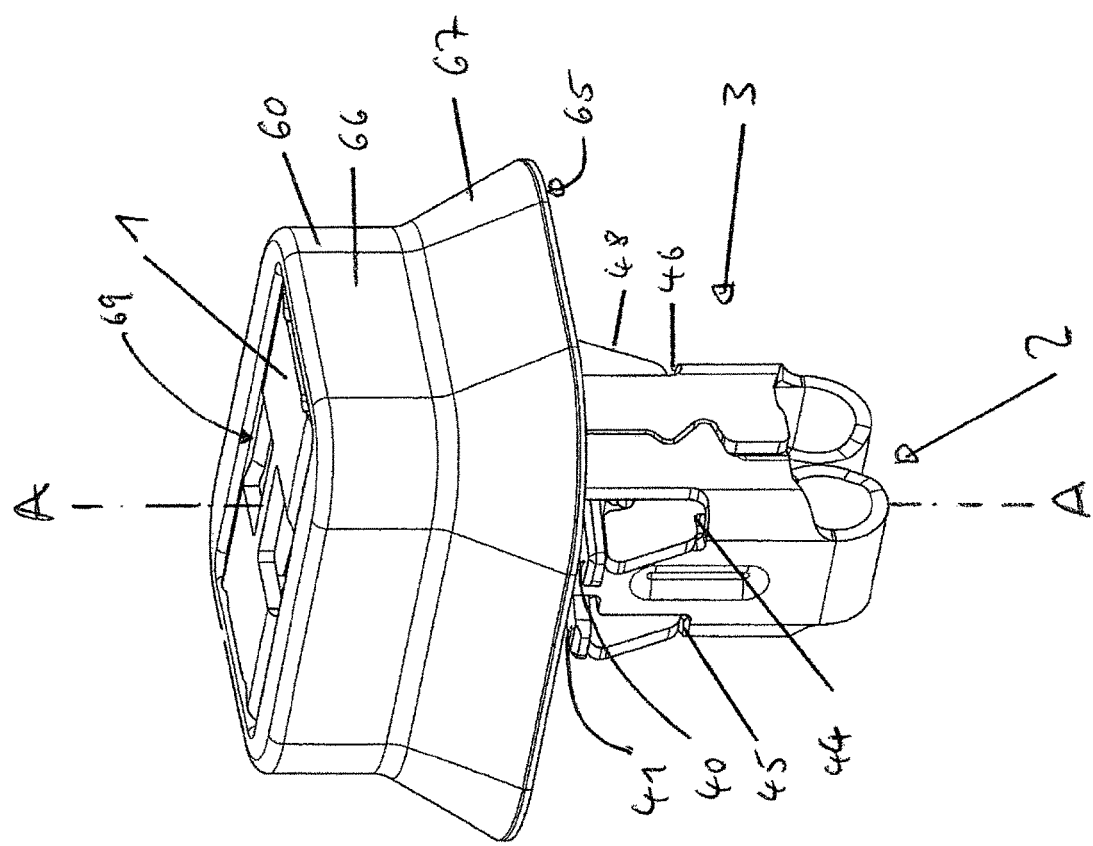
FIG. 4 a perspective oblique top view of a two-piece clip according to the invention, wherein the second component of the two-piece clip according to the invention is shown in a transparent manner.
Figure 5:
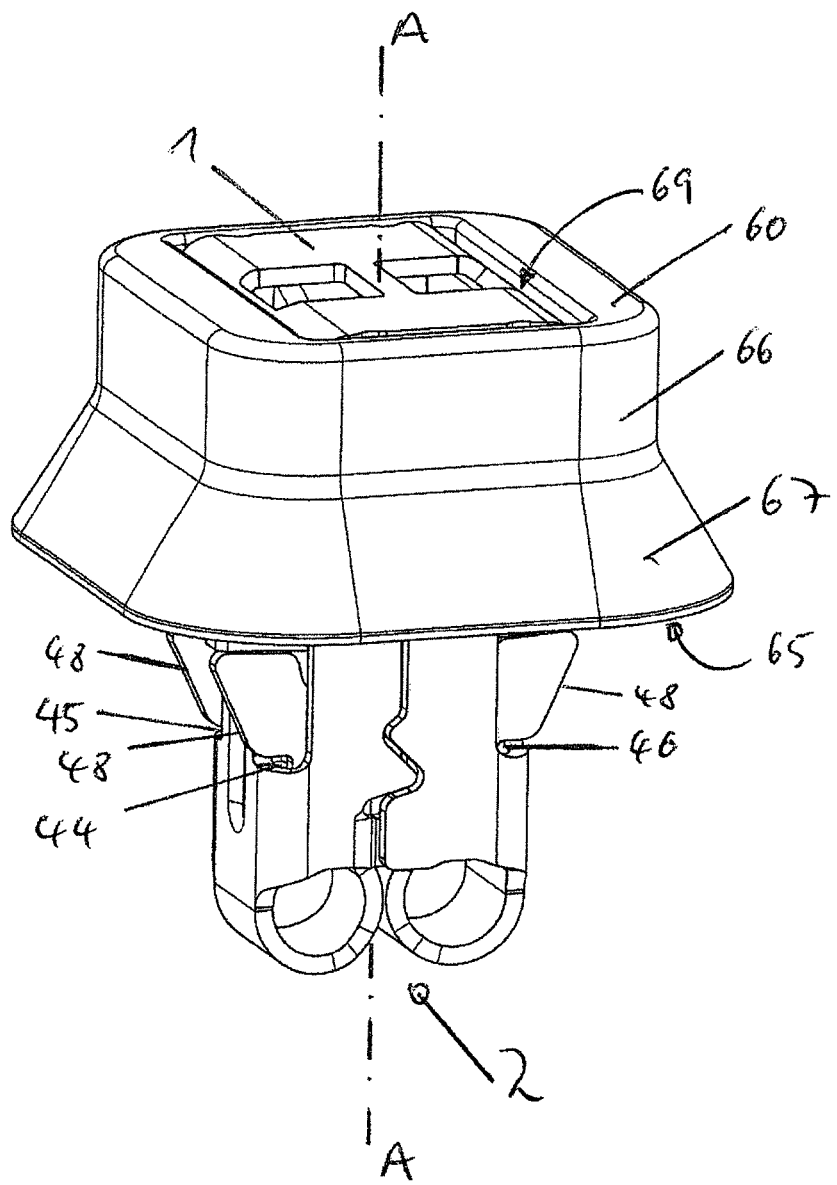
FIG. 5 a perspective oblique top view of the clip according to FIG. 4 from a slightly modified perspective and with a non-transparent second component.

The two-piece clip for securing an element to another element shown in FIGS. 4 through 11 features a first component corresponding to the clip shown in FIGS. 1 through 3, which features a head 1 and a point 2. A shaft 3, assembled from multiple subsegments, extends between the head 1 and the point 2. The shaft 3 features four protrusions, each protrusion being formed by a part of a springy element reaching through a recess 44, 45, 46, 47 into the shaft 3. Each of the protrusions features contact surface facing the head 1, which are the four clip surfaces 40, 41, 42, 43. The head 1 features four head surfaces (contact surfaces) 55, 56, 57, 58, which face the protrusions. Since the protrusions are part of the springy elements, they can be moved out of the resting position shown in the figure under application of force against an increasing spring force, wherein the spring force causes the protrusions to return to their resting position after the removal of the application of force. The resting position is the position, in which the springy element exerts no force.

The two-piece clip features a second component 60. The second component features four support surface 61, 62, 63, 64 (cf. FIGS. 10 and 11). Every support surface 61, 62, 63, 64 of the second component 60 faces one of the contact surfaces of the head embodied as head surfaces 55, 56, 57, 58, the respective contact surface (head surface) 55, 56, 57, 58 of the head 1 supporting on the respective support surface 61, 62, 63, 64. The second component 60 further features a contact surface 65 facing the protrusions. The contact surface 65 of the second component 60 is designed as a rectangular ring with rounded corner.

The second component 60 has an upper part 66 featuring a constant external outline, as well as a lower part 67, which expands screen-like toward the point 2, ending in the contact surface 65 facing the protrusions.

The second component 60 features an opening, with the shaft 3 extending through it. The opening 68 is formed at the bottom of a recess 69 of the second component 60. The recess 69 of the second component 60 receives the head 1. The recess 69 is so deep that when the contact surfaces 55, 56, 57, 58 of the head 1 support on the respective support surfaces 61, 62, 63, 64, the head 1 no longer no longer protrudes from the recess 1 (see, for instance, FIG. 4 and FIG. 5). In the two embodiments shown among the exemplary embodiments in FIGS. 4 through 11 and 12 through 18, the head 1 ends level with the edge of the second component 60 limiting the recess 69.

In the two exemplary embodiments according to FIGS. 4 through 11 and 12 through 18, the first component of the two-piece clip (described in further detail with reference to FIGS. 1 through 3) is made out of metal, whereas the second component 60 (FIGS. 4 through 11) or 70 (FIGS. 12 through 18) is made of a synthetic material.

Figure 6:
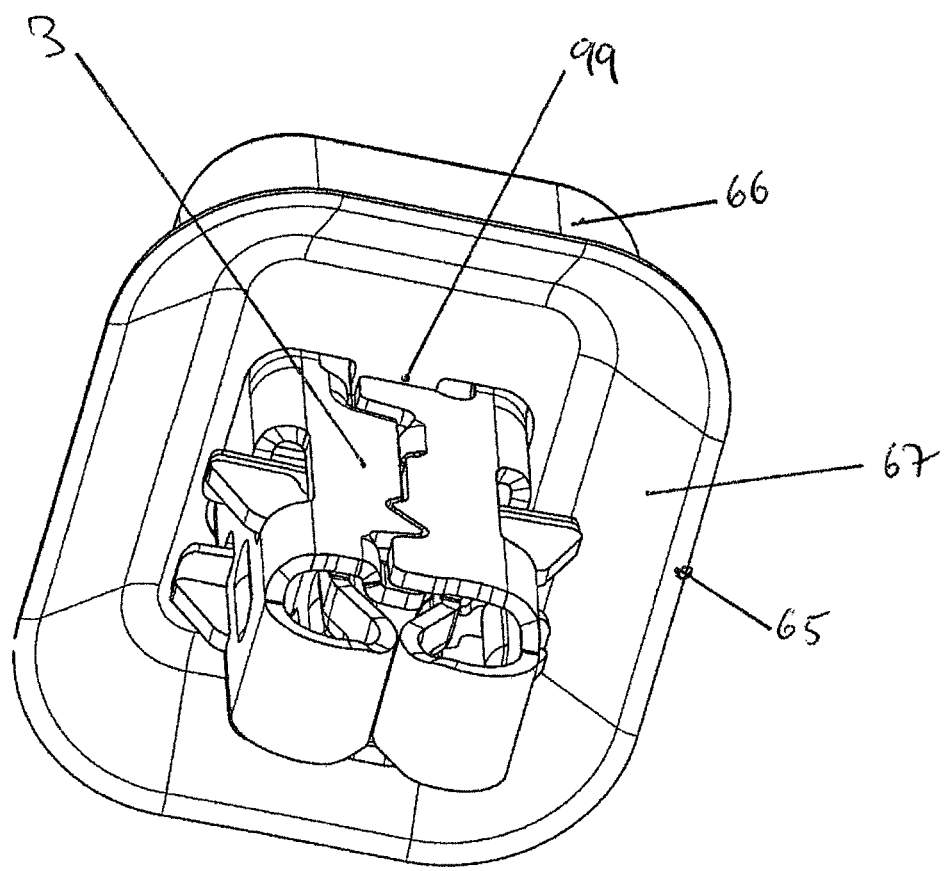
FIG. 6 a perspective view from diagonally below of the clip according to FIG. 4.
Figure 7:
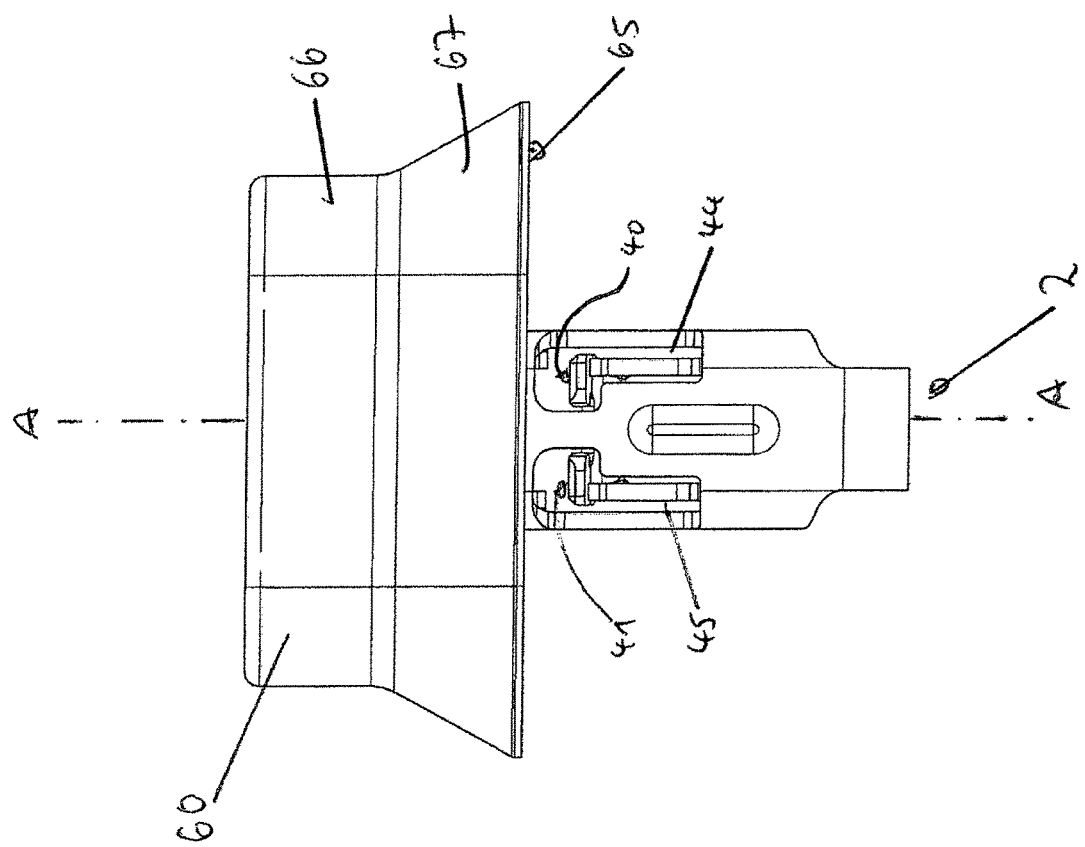
FIG. 7 a side view of the clip according to FIG. 4.
Figure 8:
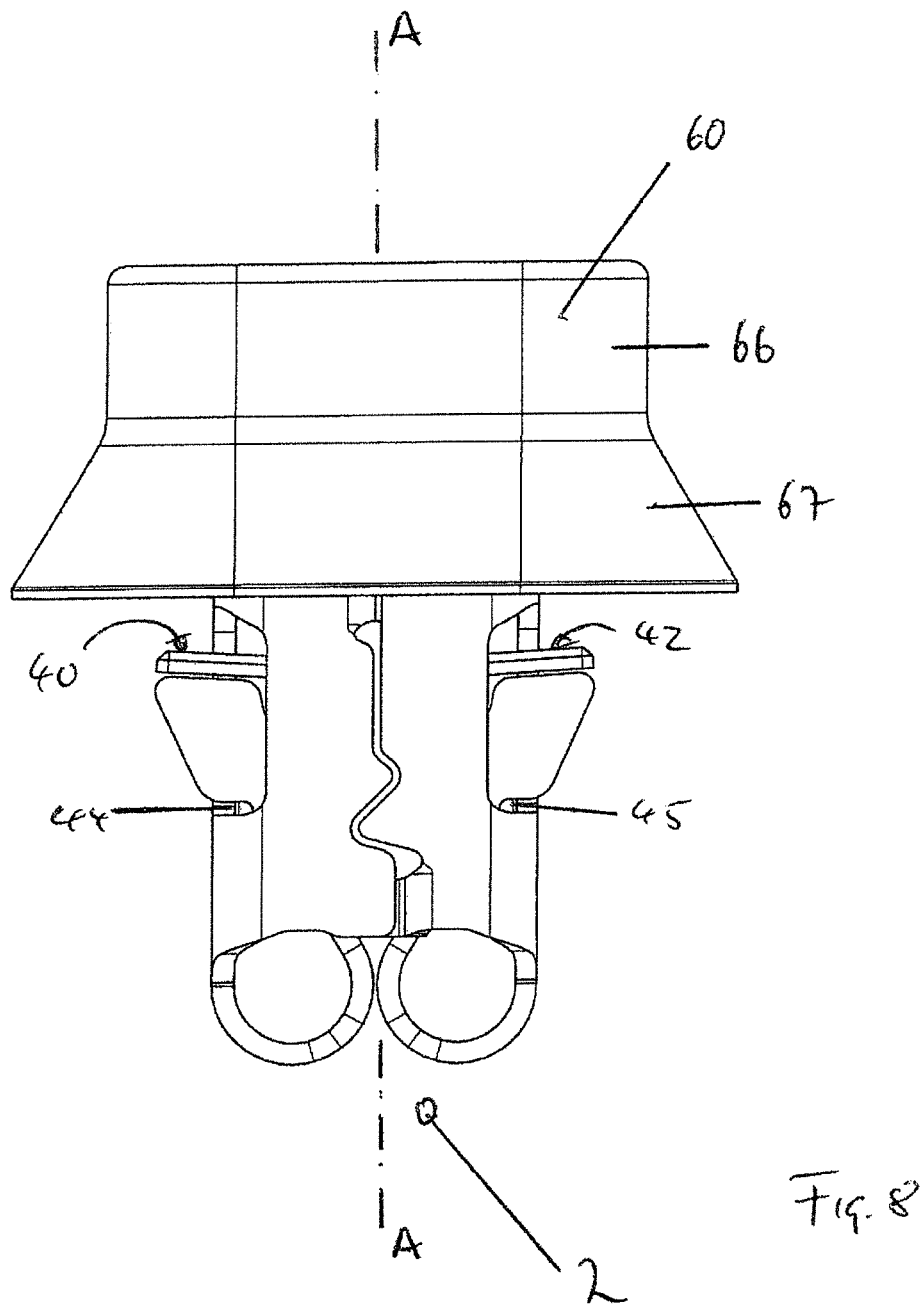
FIG. 8 a front view of the clip according to FIG. 4.
Figure 9:
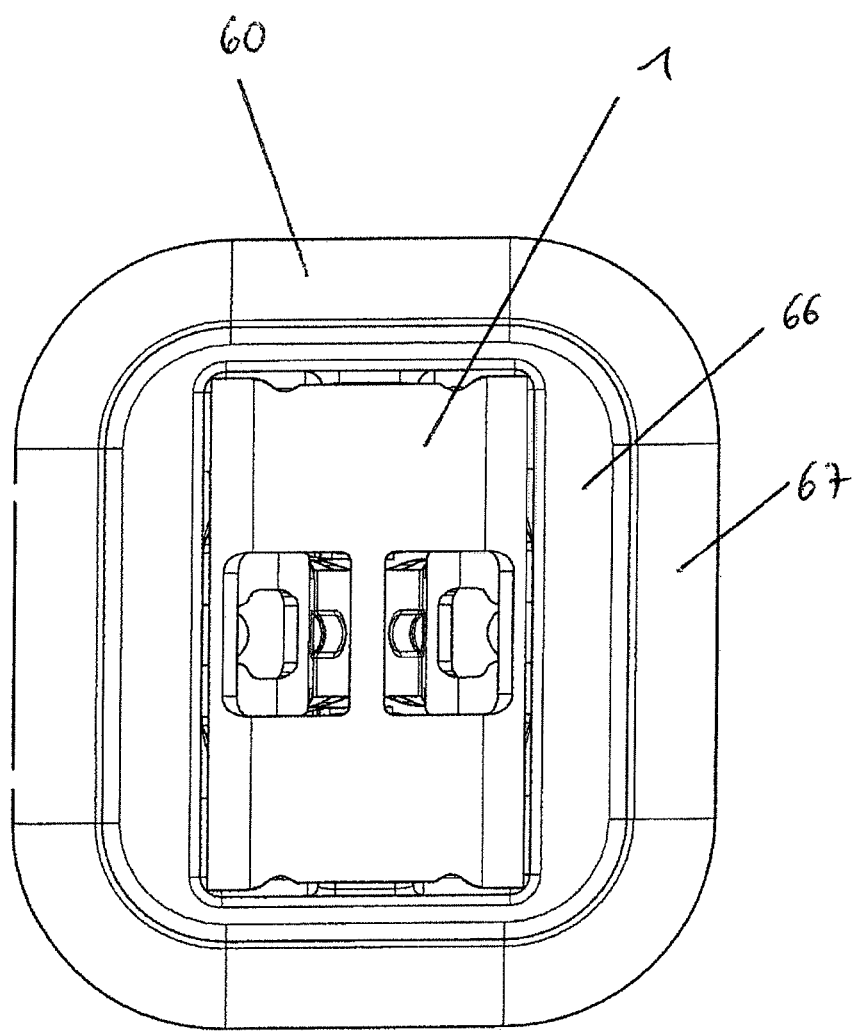
FIG. 9 a top view of the clip according to FIG. 4.
Figure 10:
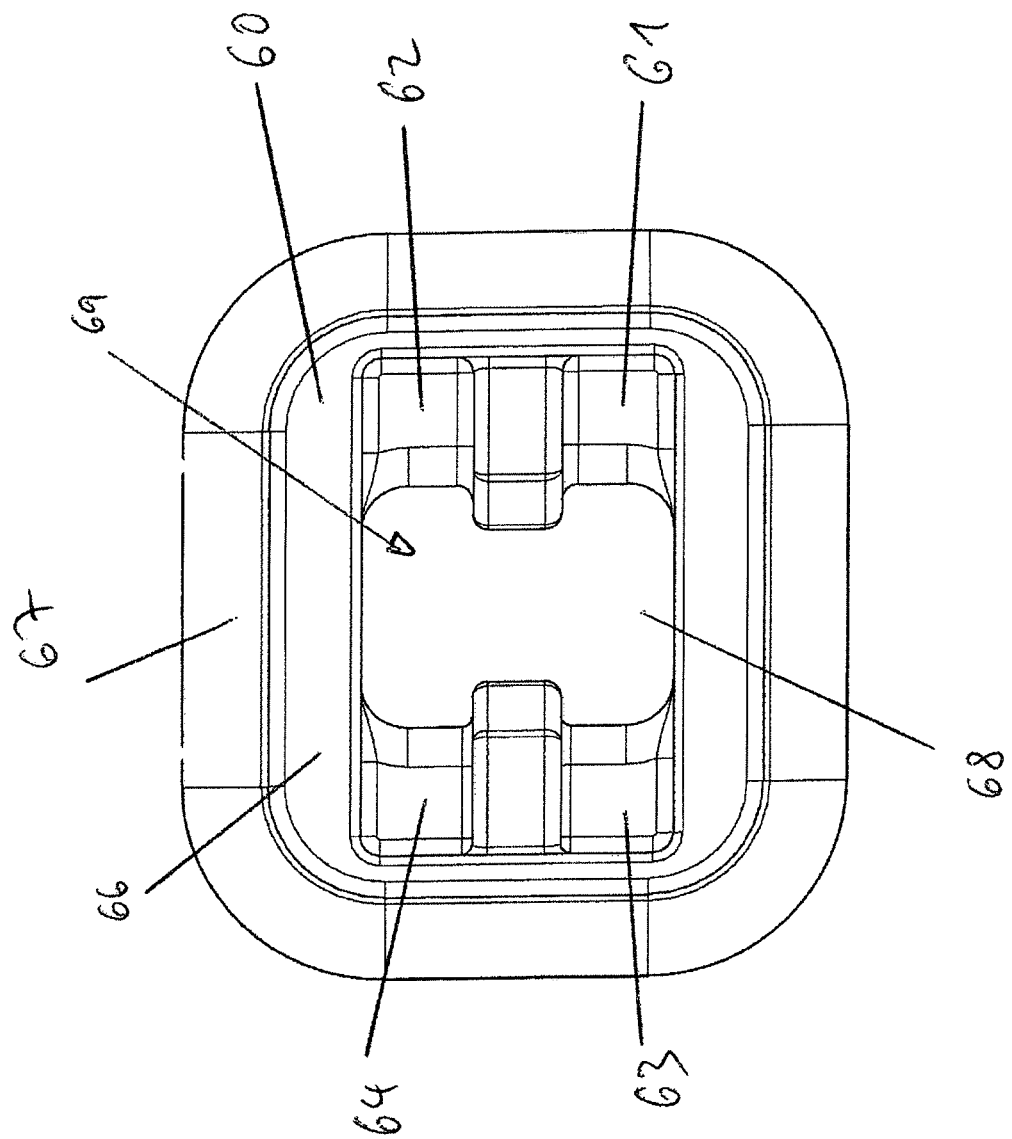
FIG. 10 a top view on the second component of the clip according to FIG. 4.
Figure 11:
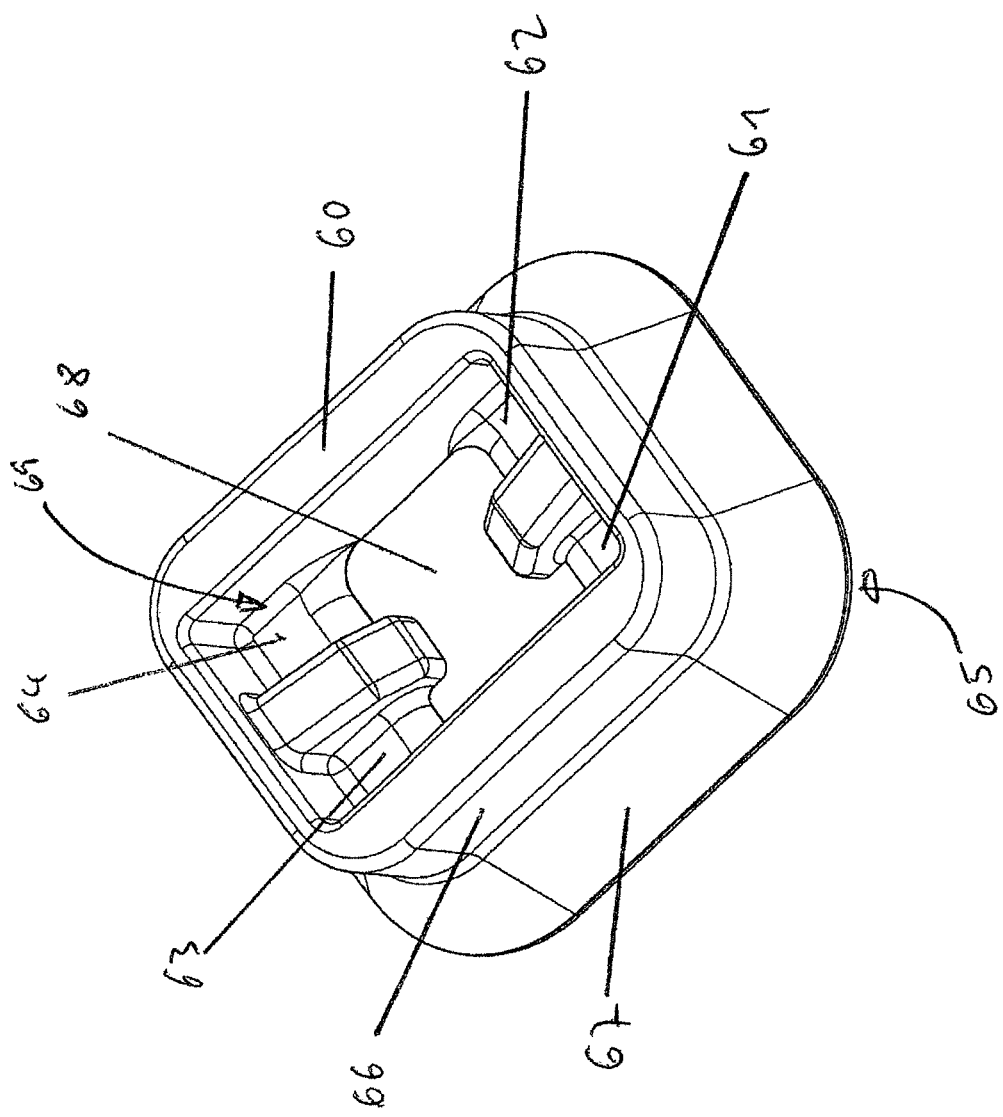
FIG. 11 a perspective top view of the second component of the clip according to FIG. 4.
Figure 12:
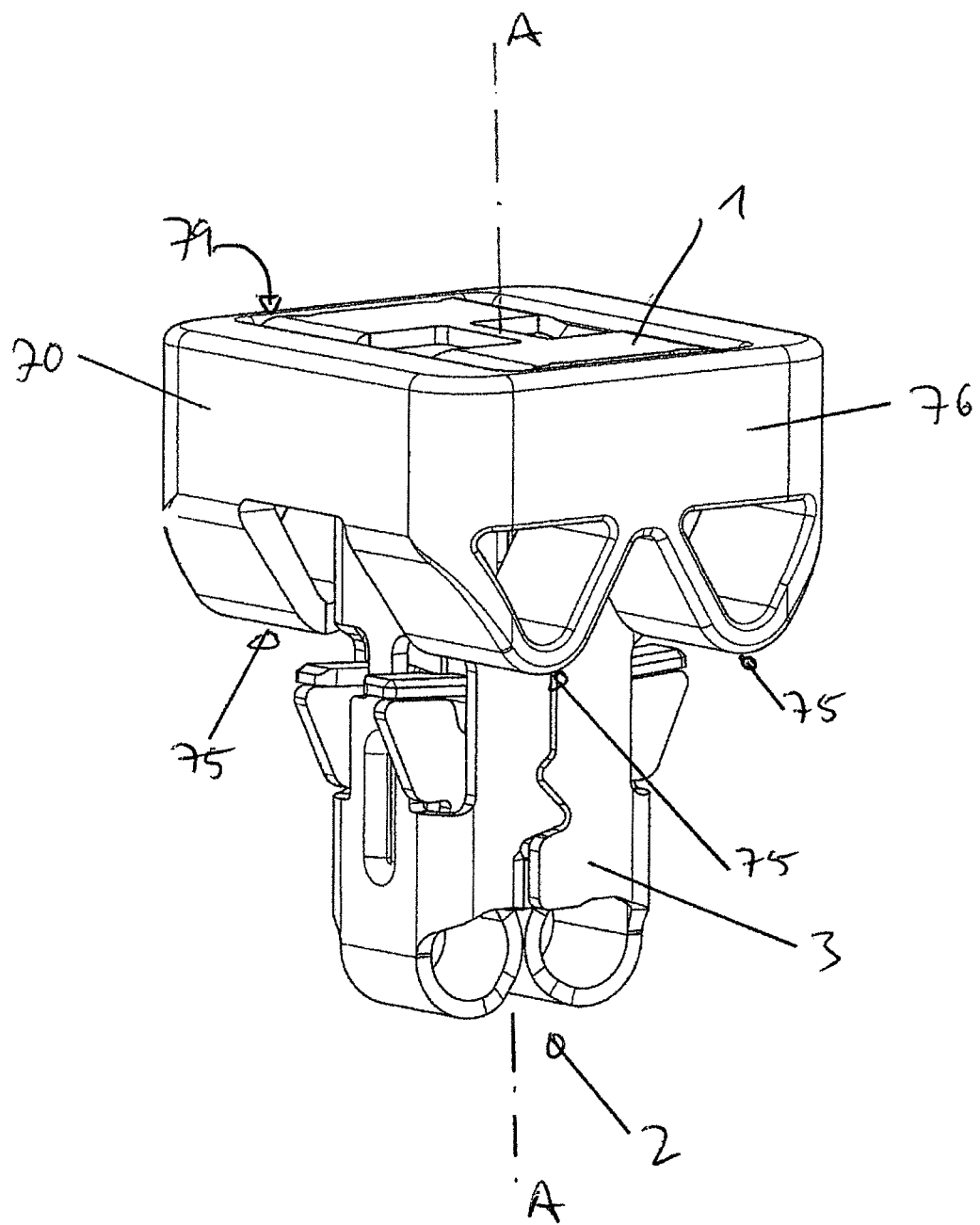
FIG. 12 a perspective oblique top view of a second embodiment of a two-piece clip according to the invention, wherein the second component of the two-piece clip according to the invention is shown in a transparent manner.
Figure 13:
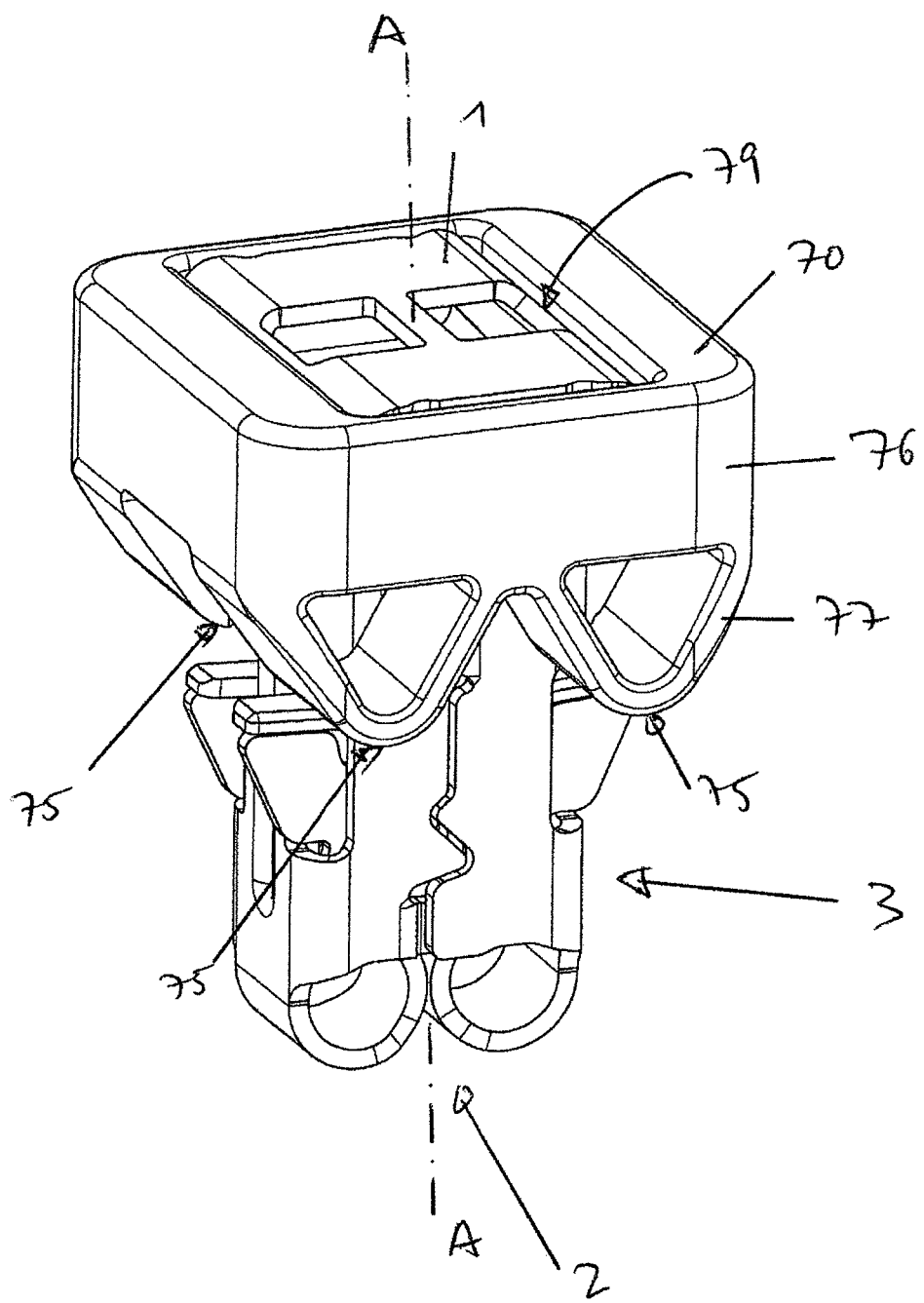
FIG. 13 a perspective oblique top view of the clip according to FIG. 12 with a non-transparent second component.
Figure 14:
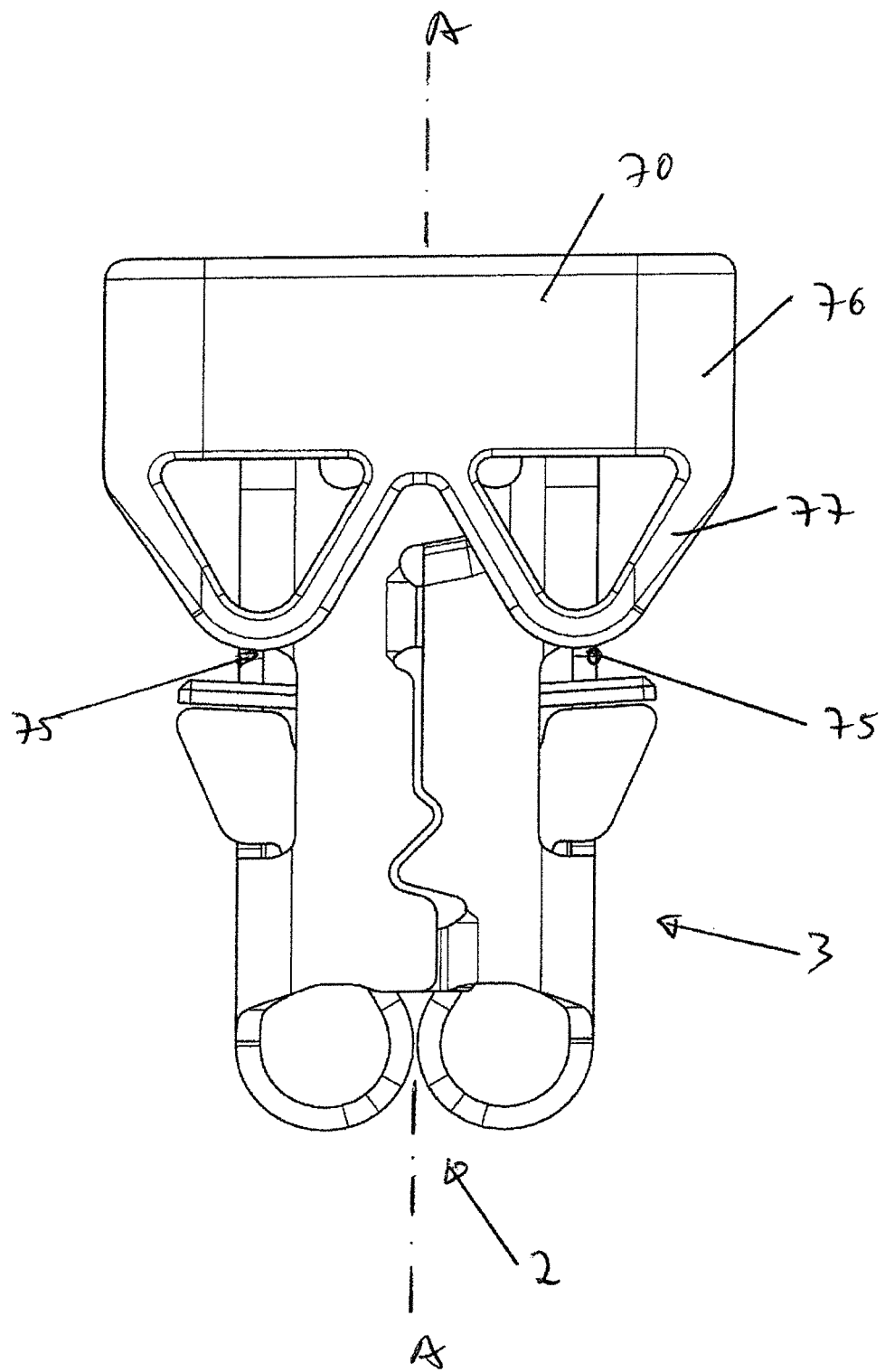
FIG. 14 a front view of the clip according to FIG. 12.
Figure 15:
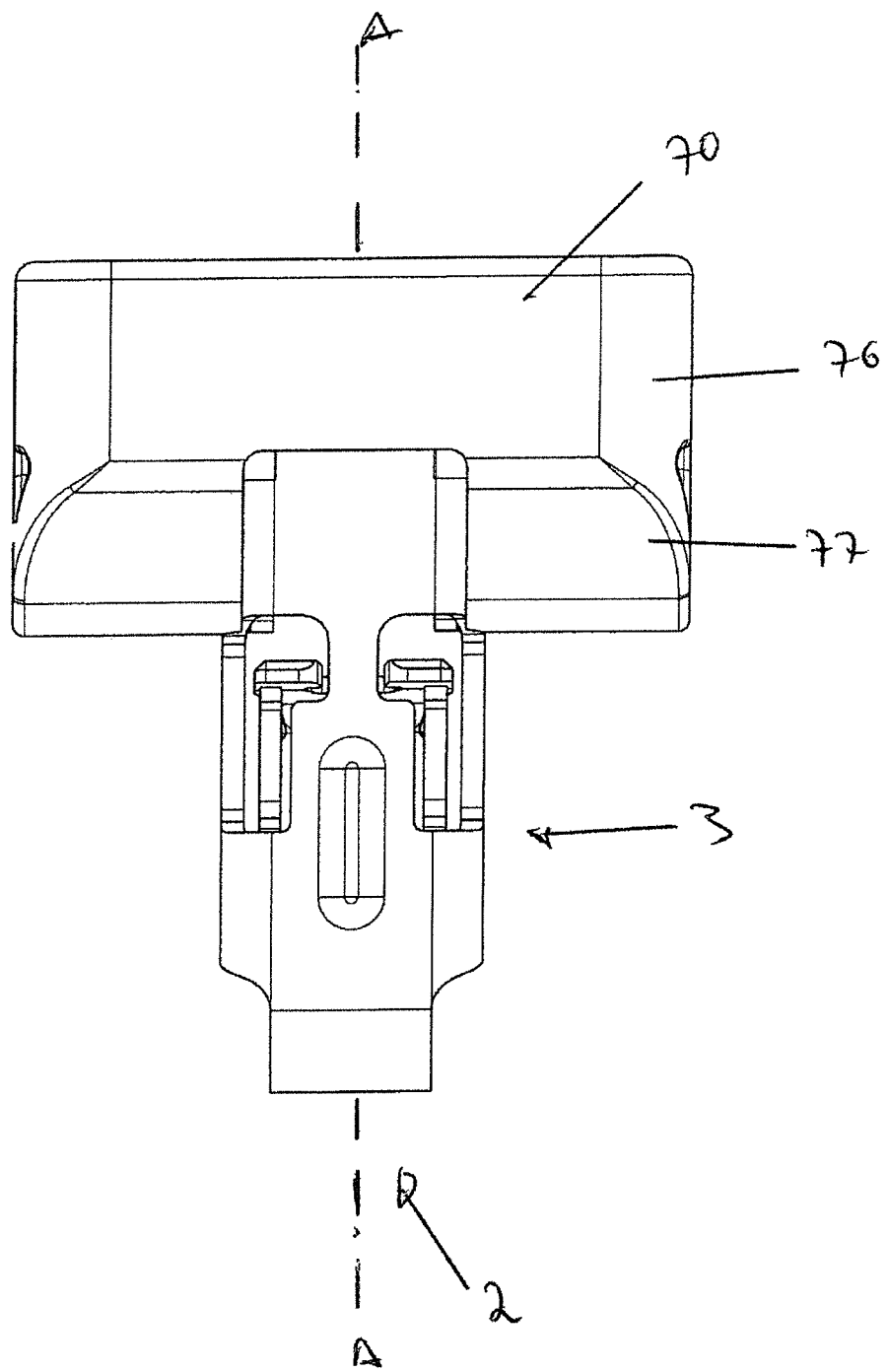
FIG. 15 a side view of the clip according to FIG. 12.
Figure 16:
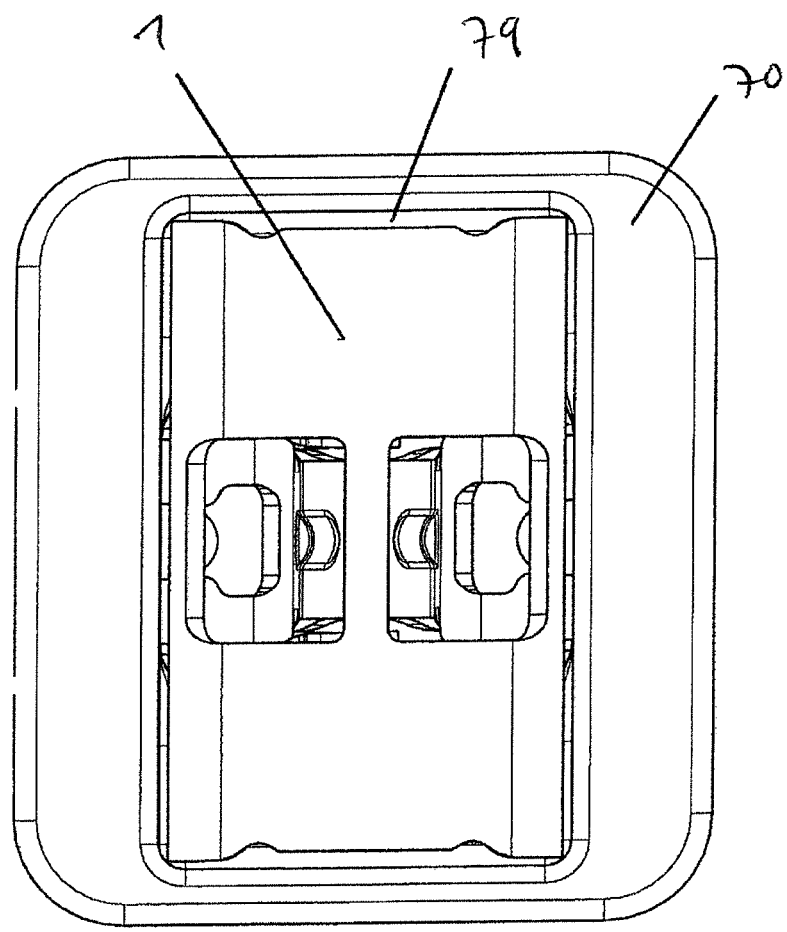
FIG. 16 a top view of the clip according to FIG. 12.
Figure 17:
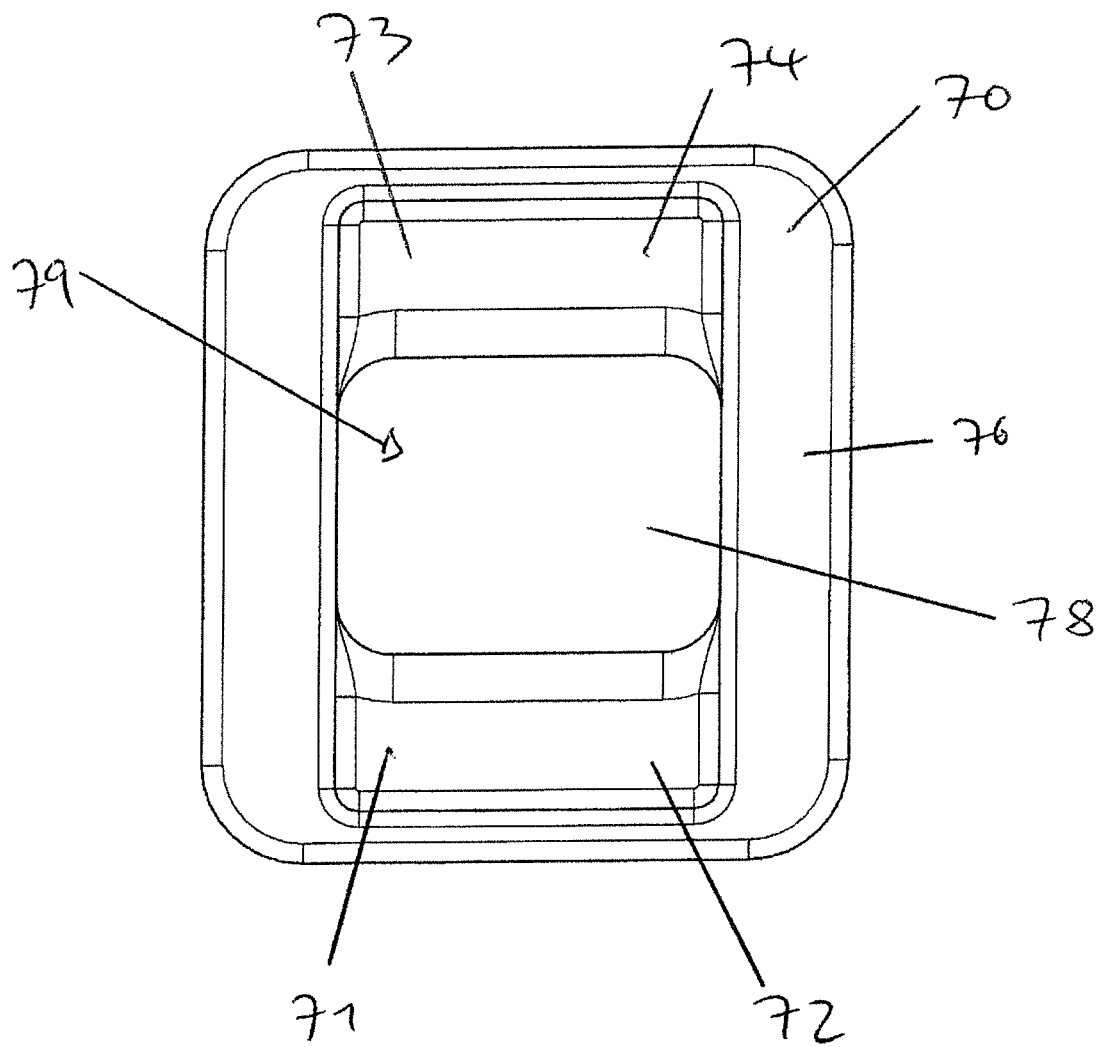
FIG. 17 a top view on the second component of the clip according to FIG. 12.
Figure 18:
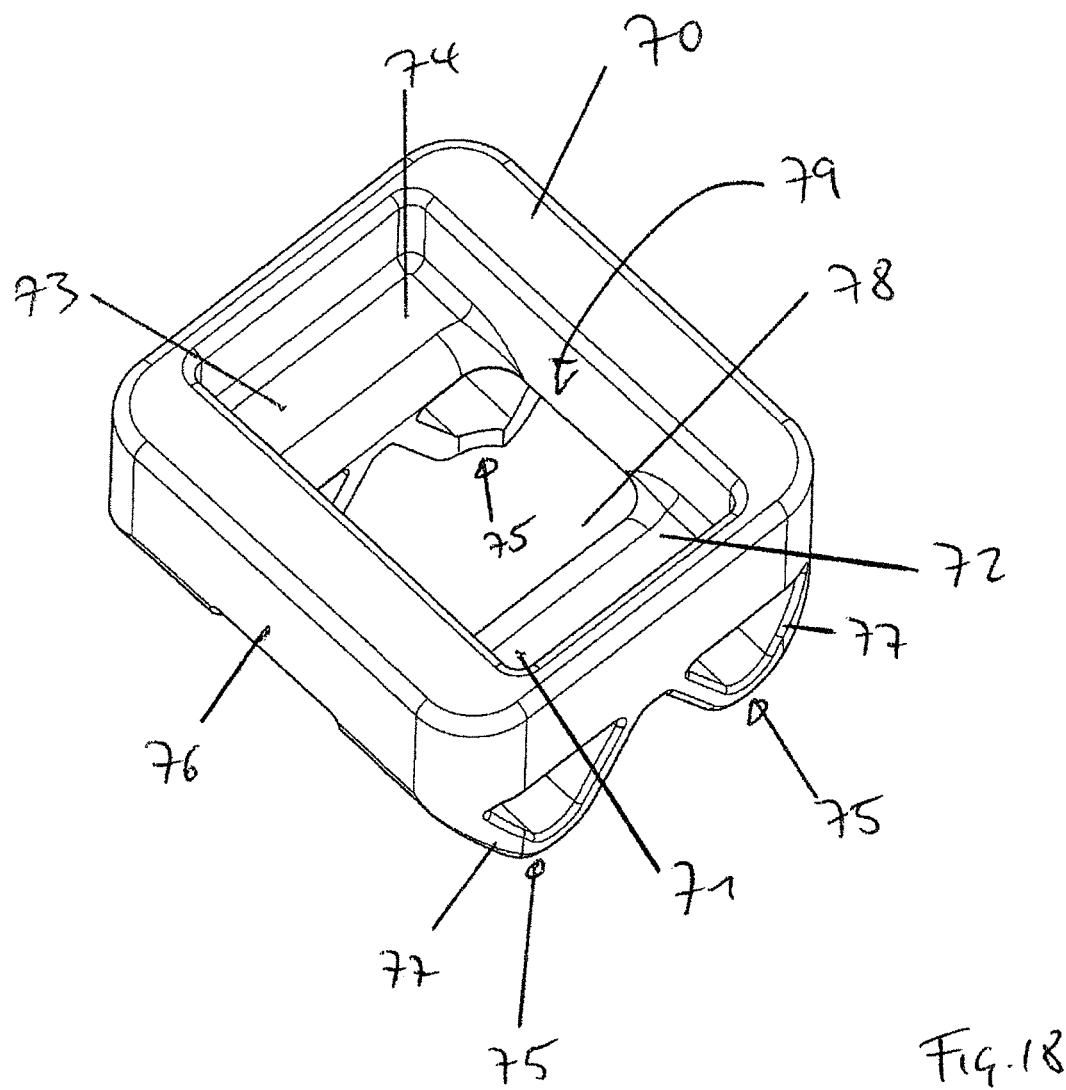
FIG. 18 a perspective top view of the second component of the clip according to FIG. 12.

The second component 60 features two protrusions 99, which protrude into the opening 68. These protrusions 99 of the second component 60 serve as a security device. As shown in FIG. 6, the protrusion 99 engages a recess on the first component and comes into contact with the edge of the recess of the first component. The interaction between the protrusion 99 and the edge of the recess of the first component prevents the second component 60 in from moving in the direction of the point 2.

The second component 70 of the second embodiment of the two-piece clip shown in FIGS. 12 through 18 differs from the second component 60 shown in the FIGS. 4 through 11 in the design of the lower part 77, of the support surfaces, and of the opening through which the shaft extends. The second component 70 of the embodiment according to FIGS. 12 through 18 features support surfaces 71, 72, 73, 74, wherein the support surface 71 transitions into the support surface 72, and the support surface 73 transitions into the support surface 74. Every support surface 71, 72, 73, 74 of the second component 70 faces one of the contact surfaces of the head embodied as head surfaces 55, 56, 57, 58, the respective contact surface (head surface) 55, 56, 57, 58 of the head 1 supporting on the respective support surface 71, 72, 73, 74. The second component 70 further features an opening 78 and a recess 79 corresponding to the opening 68 and the recess 69. Whereas the embodiment according to FIGS. 4 through 11 features an annular contact surface 65, the second embodiment according to FIGS. 12 through 18 features four contact surfaces 75. The respective contact surfaces 75 are formed on protrusions of the second component 70. The protrusions are embodied as bridges and have two shanks that meet in a point at which the contact surfaces 75 of the second component 70 facing the protrusion are arranged.

The third embodiment shown with reference to FIGS. 19 and 20 specifically distinguishes itself in three ways from the two other embodiments (FIG. 4 through FIG. 18). On the one hand, the second component 80 does not feature a recess receiving the head 1. Furthermore, the second component 80 is also made out of metal, similar to the first component of this embodiment. Thirdly, the upper part 86 and the lower part 87 are in a mutual flexible connection at an edge 90 (a bent portion). In the decompressed position [shown] in FIGS. 19 and 20, the lower part 87 is at a distance from the upper part 86. When the two-piece clip is inserted with its point 2 into an opening of an element and if the lower part 87 of the second component 80 comes into contact with this element, the lower part 87 is swung onto the upper part 86 around the edge 90, when additional force is applied along the shaft axis A-A. The contact surface 55 of the head 1 supports on a support surface 81 of the upper part 86. The second component 80 features a contact surface facing the protrusion 85.

The invention claimed is:

1. A two-piece clip for securing an element to another element, wherein the clip comprises a first component is formed of a bent metal sheet, the clip including
   a head and
   a shaft, extending from the head along a shaft axis, the shaft having a point, the shaft having at least one protrusion featuring a contact surface facing the head and the head having a contact surface facing the protrusion,
   further including a second component having a support surface facing the contact surface of the head, on which the contact surface of the head is supported, as well as a contact surface facing the protrusion, and a recess receiving the head,
   wherein the at least one protrusion that features the contact surface is a springy element that is pushed in while the at least one protrusion is introduced through the recess and that bounces back after the at least one protrusion has passed the recess.

2. The two-piece clip according to claim 1, wherein the second component has an opening with the shaft extending therethrough.

3. The two-piece clip according to the claim 2, wherein the second component on the shaft is loosely movable on the shaft loose between a first position, in which the support surface abuts the contact surface of the head, and a second position, in that an elevation or a protrusion of the second component pushes against an edge of a recess of the first component, and/or in that the second component pushes against an elevation of the shaft.

4. The two-piece clip according to claim 1, wherein the depth of the recess being such that when the contact surface of the head supports on the support surface of the second component, the head does not protrude out of the recess.

5. The two-piece clip according to claim 1, wherein the recess and the head have a rectangular cross section.

6. The two-piece clip according to claim 1, wherein the first component and the second component are made of different materials.

7. The two-piece clip according to claim 1, wherein the contact surface facing the protrusion of the second component is a contact surface, specifically one that is annular shaped, that surrounds the shaft axis.

8. The use of the two-piece clip according to claim 1 for securing an airbag to an element of a vehicle.

9. A clip according to claim 1, wherein the first component
   has the head and a point and
   has a first side and a second side, wherein the first side extends from the head in the direction of the point, and the second side extends from the head in the direction of the point,
   wherein a first side wall extends from the first side in the direction of the second side,
   wherein the head features a side surface and a contact surface facing the point, and wherein
   the side surface of the head transitions into the contact surface of the head facing the point by way of a rounded edge, and/or wherein
   the first side transitions in the first side wall by way of a rounded edge.

10. The clip according to claim 9, wherein the side surface of the head transitions into the contact surface of the head facing the point via a first rounded edge, and the first side transitions into the first side wall via a second rounded edge, and the first rounded edge transitions into the second rounded edge via an arched segment.

11. A device with a first element and with a second element attached to the first element, wherein the first element has a hole and the second element is attached to the first element by means of a clip according to claim 1, wherein the clip reaches across the hole in such a manner that the head of the clip is arranged on one side of the first element and the point of the clip is arranged on the opposing side of the element.

12. A clip for securing a first element to a second element, wherein the clip
   has a head and a point defining the first element that is formed of a bent metal sheet, and
   has a first side and a second side, wherein the first side extends from the head in the direction of the point, and the second side extends from the head in the direction of the point,
   wherein a first side wall extends from the first side in the direction of the second side, wherein
   the head features a side surface and a contact surface facing the point, and in that
   the side surface of the head transitions into the contact surface of the head facing the point via a first rounded edge, and the first side transitions into the first side wall via a second rounded edge, and the first rounded edge transitions into the second rounded edge via an arched segment, and
   the second element includes a recess receiving the head.

13. The clip according to claim 12, wherein the contact surface of the head facing the point transitions into the first side wall via an arched segment.

14. A device with a first element and with a second element attached to the first element, wherein the first element has a hole and the second element is attached to the first element by means of a clip according to claim 12, wherein the clip reaches across the hole in such a manner that the head of the clip is arranged on one side of the first element and the point of the clip is arranged on the opposing side of the element.

15. A two-piece clip for securing an element to another element, wherein the clip comprises a first component is formed of a bent metal sheet, the clip including
   a head and
   a shaft, extending from the head along a shaft axis, the shaft having a point, the shaft having at least one protrusion featuring a contact surface facing the head and the head having a contact surface facing the protrusion,
   further including a second component having a support surface facing the contact surface of the head, on which the contact surface of the head is supported, as well as a contact surface facing the protrusion, the second component further having an opening with the shaft extending therethrough, and a recess receiving the head,
   wherein the at least one protrusion that features the contact surface is a springy element that is pushed in while the at least one protrusion is introduced through the recess and that bounces back after the at least one protrusion has passed the recess.

16. The two-piece clip according to the claim 15, wherein the second component on the shaft is loosely movable on the shaft loose between a first position, in which the support surface abuts the contact surface of the head, and a second position, in that an elevation or a protrusion of the second component pushes against an edge of a recess of the first component, and/or in that the second component pushes against an elevation of the shaft.

17. The two-piece clip according to claim 15, wherein the depth of the recess is such that when the contact surface of the head supports on the support surface of the second component, the head does not protrude out of the recess.

18. The two-piece clip according to claim 15, wherein the contact surface of the head facing the point transitions into the first side wall via an arched segment.

\* \* \* \* \*